(12) United States Patent
Qi et al.

(10) Patent No.: US 12,339,420 B2
(45) Date of Patent: Jun. 24, 2025

(54) EYEGLASS LENS

(71) Applicant: HOYA LENS THAILAND LTD., Pathumthani (TH)

(72) Inventors: Hua Qi, Tokyo (JP); Takako Ishizaki, Tokyo (JP); Shigetoshi Kono, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 458 days.

(21) Appl. No.: 17/784,529

(22) PCT Filed: Dec. 15, 2020

(86) PCT No.: PCT/JP2020/046628
§ 371 (c)(1),
(2) Date: Jun. 10, 2022

(87) PCT Pub. No.: WO2021/131874
PCT Pub. Date: Jul. 1, 2021

(65) Prior Publication Data
US 2023/0020067 A1    Jan. 19, 2023

(30) Foreign Application Priority Data
Dec. 27, 2019   (JP) .................... 2019-237938

(51) Int. Cl.
G02B 1/11   (2015.01)
G02C 7/02   (2006.01)

(52) U.S. Cl.
CPC .............. G02B 1/11 (2013.01); G02C 7/022 (2013.01)

(58) Field of Classification Search
CPC . G02B 1/11; G02B 1/14; G02C 7/022; G02C 7/02; G02C 7/06; G02C 2202/24
(Continued)

(56) References Cited

U.S. PATENT DOCUMENTS 11,131,867 B2 *  9/2021  Guillot ............. B29D 11/00009
2014/0132933 A1 *  5/2014  Martinez ............. G02C 13/003
351/159.48
(Continued)

FOREIGN PATENT DOCUMENTS

JP   2019174727 A   10/2019
JP   2019179136 A   10/2019
(Continued)

OTHER PUBLICATIONS

PCT/JP2020/046628, "International Preliminary Report on Patentability", Jul. 7, 2022, 8 pages.
(Continued)

Primary Examiner — William R Alexander
(74) Attorney, Agent, or Firm — Oliff PLC

(57) ABSTRACT

Provided is an eyeglass lens 1 configured to cause rays that have entered from an object-side surface 3 to be emitted from an eyeball-side surface 4, and cause the emitted rays to converge at a predetermined position A. The eyeglass lens 1 includes a lens substrate 2 having a plurality of substrate convex portions 6 on at least one of the object-side surface 3 and the eyeball-side surface 4, and a coating film covering the surface provided with the substrate convex portions 6. The shape of convex portions present on the outermost surface of the eyeglass lens located on a side on which the substrate convex portions 6 are provided is an approximate shape of the substrate convex portions configured to cause rays that have entered the eyeglass lens 1 to converge at a position B that is closer to the object than the predetermined position A is.

8 Claims, 11 Drawing Sheets

(58) Field of Classification Search
USPC .......................................................... 359/601
See application file for complete search history.

(56) References Cited

U.S. PATENT DOCUMENTS

| | | | |
|---|---|---|---|
| 2016/0178934 A1* | 6/2016 | Curley .................. | G02C 7/086 |
| | | | 351/57 |
| 2016/0306192 A1* | 10/2016 | Marshall .............. | G02B 3/0043 |
| 2017/0131567 A1* | 5/2017 | To ............................ | G02C 7/06 |
| 2017/0146824 A1* | 5/2017 | Martinez ................. | G02C 7/06 |
| 2018/0157065 A1* | 6/2018 | Curley ..................... | G02C 9/00 |
| 2019/0324293 A1* | 10/2019 | Marshall .............. | G02B 3/0043 |
| 2020/0132441 A1 | 4/2020 | Uchidani et al. | |
| 2020/0198267 A1 | 6/2020 | Ishizaki et al. | |
| 2020/0241325 A1* | 7/2020 | Chalberg ......... | B29D 11/00038 |
| 2021/0231972 A1* | 7/2021 | Guillot .................... | G02C 7/06 |
| 2021/0373357 A1 | 12/2021 | Guillot et al. | |

FOREIGN PATENT DOCUMENTS

| | | |
|---|---|---|
| WO | 2019166659 A1 | 9/2019 |
| WO | 2019206569 A1 | 10/2019 |
| WO | 2020079105 | 4/2020 |

OTHER PUBLICATIONS

PCT/JP2020/046628, "English Translation of International Search Report", Feb. 16, 2021, 2 pages.

\* cited by examiner

Portion having maximum absolute value of differences in lens thickness direction between shape of virtual partial sphere and shape of actual coating film convex portion

EYEGLASS LENS

CROSS-REFERENCE TO RELATED APPLICATIONS

This application is the National Stage of International Application No. PCT/JP2020/046628, filed Dec. 15, 2020, which claims priority to Japanese Patent Application No. 2019-237938, filed Dec. 27, 2019, and the contents of which is incorporated by references.

TECHNICAL FIELD

The present disclosure relates to an eyeglass lens.

BACKGROUND ART

Patent Document 1 discloses an eyeglass lens for suppressing the progression of a refractive error such as near-sightedness. Specifically, for example, minute spherical convex portions (substrate convex portions in this specification) with a diameter of about 1 mm are formed on a convex surface, which is the object-side surface of the eyeglass lens. With an eyeglass lens, normally, rays that have entered from the object-side surface are emitted from the eyeball-side surface and are then focused on the wearer's retina (a predetermined position A in this specification). On the other hand, as for rays that have passed through the minute convex portion, rays that enter the eyeglass lens are focused at a position B closer to the object than the predetermined position A is. As a result, the progression of near-sightedness is suppressed.

CITATION LIST

Patent Documents

Patent Document 1: US 2017/0131567A

SUMMARY OF DISCLOSURE

Technical Problem

The inventors of the present disclosure found that, if a coating film (e.g., a hard coating film or an antireflection film) similar to a conventional coating film is formed on a surface (a convex surface, which is the object-side surface), which is provided with the minute convex portions, of the eyeglass lens disclosed in Patent Document 1, the function of suppressing the progression of near-sightedness may deteriorate.

An embodiment of the present disclosure aims to provide a technique by which the effect of suppressing near-sightedness can be sufficiently exhibited even after a coating film is formed on a lens substrate.

Solution to Problem

The inventors of the present disclosure conducted intensive studies in order to resolve the above issues. The coating film covers a surface provided with the substrate convex portions. In this case, the shape of the outermost surface of the coating film has coating film convex portions originating from the substrate convex portions.

If no coating film is provided, rays are focused by the substrate convex portions at a position closer to the object than the predetermined position A is. However, if a coating film is formed on the lens substrate, whether rays are focused at the same position as that of the substrate convex portions or the vicinity thereof depends on the shape of the outermost surface of the coating film, that is, the shape of the coating film convex portions.

In view of this, the inventors of the present disclosure conceived the following methods.

The inventors found that, if the shape of a convex portion on the outermost surface of an eyeglass lens is an approximate shape of a substrate convex portion, the effect of suppressing near-sightedness can be sufficiently exhibited.

Preferably, the shape of a substrate convex portion (i.e., a partially spherical shape) is virtualized from the shape of an actual coating film convex portion. The inventors found that the effect of suppressing near-sightedness can be further exhibited when a difference between the shape of a virtual partial sphere and the shape of the actual coating film convex portion is kept at a predetermined value.

The present disclosure was made based on the above-described findings.

A first aspect according to the present disclosure is an eyeglass lens configured to cause rays that have entered from an object-side surface to be emitted from an eyeball-side surface, and cause the emitted rays to converge at a predetermined position A, the eyeglass lens including:
 a lens substrate having a plurality of substrate convex portions on at least one of the object-side surface and the eyeball-side surface; and
 a coating film covering the surface provided with the substrate convex portions,
 in which the shape of coating film convex portions present on the outermost surface of the eyeglass lens located on a side on which the substrate convex portions are provided is an approximate shape of the substrate convex portions configured to cause rays that have entered the eyeglass lens to converge at a position B that is closer to the object than the predetermined position A is.

A second aspect according to the present disclosure is the aspect according to the first aspect,
 in which, out of a large number of rays that can be obtained by ray tracing calculation, evenly enter a predetermined range of the object-side surface of the eyeglass lens, and pass through the coating film, the number of stray light rays that do not pass through the vicinity of the predetermined position A and also do not pass through the vicinity of the position B that is closer to the object is less than or equal to 30% of the number of incident rays.

A third aspect of the present disclosure is the eyeglass lens according to the first or second aspect,
 in which a profile curve of astigmatism at a base of the coating film convex portion in an astigmatism distribution for the shape of the outermost surface of the coating film is 0.20 mm or less.

A fourth aspect according to the present disclosure is the eyeglass lens according to the first to third aspects,
 in which the maximum absolute value of differences in a lens thickness direction between a sphere that is optimally approximated to the shape of the coating film convex portion and the shape of the actual coating film convex portion is 0.1 µm or less.

A fifth aspect according to the present disclosure is the aspect according to any one of the first to fourth aspects, in which a relationship between a protruding length $L_c$ of the coating film convex portion and a protruding length $L_l$ of the substrate convex portion satisfies Formula (1) below, $$0.6 \leq L_c/L_l \leq 1.5 \qquad \text{Formula (1).}$$

Other aspects listed below are applicable to the above aspects.

According to another aspect of the present disclosure, the coating film convex portion causes rays that have entered the eyeglass lens to converge at a position B that is closer to the object than the predetermined position A is by an amount in a range of more than 0 mm and 10 mm or less.

According to another aspect of the present disclosure, the coating film includes a λ/4 film that is in contact with the lens substrate, a hard coating film formed on the λ/4 film, and an antireflection film formed on the hard coating film.

According to still another aspect of the present disclosure, a refractive index of the lens substrate is higher than that of the λ/4 film, and a refractive index of the λ/4 film is higher than that of the hard coating film.

According to another aspect of the present disclosure, the stray light ratio may be set to more than 0% (or 1% or more, or 3% or more) and 30% or less. Also, because it is preferable to reduce the stray light ratio, the stray light ratio is preferably set to 20% or less, and is more preferably set to 15% or less.

According to another aspect of the present disclosure, the maximum absolute value of differences in a lens thickness direction between a sphere that is optimally approximated to the shape of the coating film convex portion and the shape of the actual coating film convex portion is preferably 0.06 μm or less.

According to another aspect of the present disclosure, the outermost surface of the eyeglass lens (i.e., the outermost surface of the coating film) has a shape that causes rays that have entered the eyeglass lens to converge at the position B that is closer to the object than the predetermined position A is by an amount in a range of more than 0 mm and 10 mm or less. Note that the above range is preferably 0.1 to 7 mm, more preferably 0.1 to 5 mm, and even more preferably 0.3 to 3 mm.

The following describes still another aspect of the present disclosure. Other aspects listed below can be applied instead of the first aspect. Also, the above-described aspects are applicable to the following aspects.

Yet another aspect according to the present disclosure is an eyeglass lens configured to cause rays that have entered from an object-side surface to be emitted from an eyeball-side surface, and cause the emitted rays to converge at a predetermined position A, the eyeglass lens including
  a lens substrate having a plurality of substrate convex portions on at least one of the object-side surface and the eyeball-side surface,
  in which the eyeglass lens is configured to suppress generation of stray light rays that do not pass through the vicinity of the predetermined position A and also do not pass through the vicinity of the position B that is closer to the object than the predetermined position A is.

Still yet another aspect according to the present disclosure is an eyeglass lens configured to cause rays that have entered from an object-side surface to be emitted from an eyeball-side surface, and cause the emitted rays to converge at a predetermined position A, the eyeglass lens including:
  a lens substrate having a plurality of substrate convex portions on at least one of the object-side surface and the eyeball-side surface; and
  a coating film covering a surface provided with the substrate convex portions,
  in which the coating film has a thickness of 3.0 μm or less.

Still yet another aspect according to the present disclosure is an eyeglass lens configured to cause rays that have entered from an object-side surface to be emitted from an eyeball-side surface, and cause the emitted rays to converge at a predetermined position A, the eyeglass lens including:
  a lens substrate having a plurality of substrate convex portions on at least one of the object-side surface and the eyeball-side surface; and
  a coating film covering a surface provided with the substrate convex portions,
  in which convex portions present on the outermost surface of the eyeglass lens located on a side on which the substrate convex portions are provided and the substrate convex portions have common light ray convergence properties.

Advantageous Effects of Disclosure

According to one embodiment of the present disclosure, the effect of suppressing near-sightedness can be sufficiently exhibited even after a coating film is formed on a lens substrate.

DESCRIPTION OF EMBODIMENTS

The following describes embodiments of the present disclosure. The following description that is based on the drawings is exemplary, and the present disclosure is not limited to the aspects that are described as examples. With regard to the specified values, more than 50% of all of the coating film convex portions (or more than 50% of all of the substrate protruding portions) preferably satisfy the following specified values. More favorably, 80% or more, 90% or more, 95% or more, or 99% or more of the coating film convex portions satisfy the specified values in a suitable order, and repeated description will be omitted.

Figure 1:
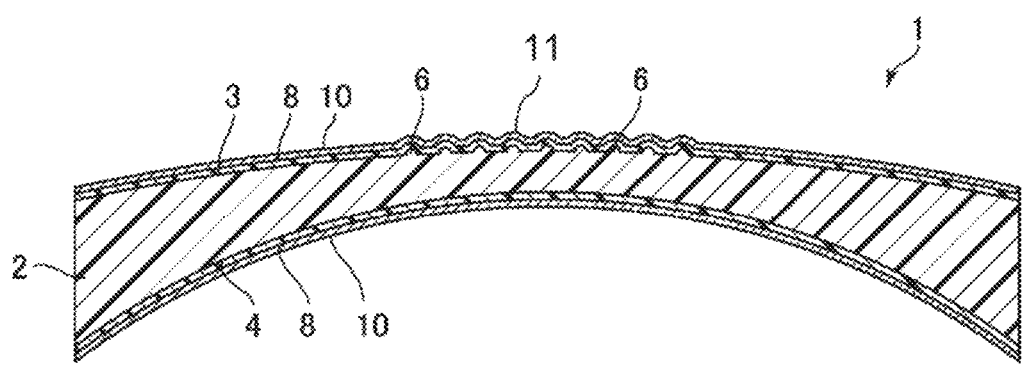
FIG. 1 is a cross-sectional view illustrating one example of an eyeglass lens according to one aspect of the present disclosure.

FIG. 1 is a cross-sectional view illustrating one example of an eyeglass lens 1 according to one aspect of the present disclosure.

An example is shown in FIG. 1 in which an object-side surface 3 is a convex surface, and an eyeball-side surface 4 is a concave surface (an example of so-called meniscus lens).

The eyeglass lens 1 according to one aspect of the present disclosure has the object-side surface 3 and the eyeball-side surface 4. The "object-side surface 3" is the surface that is located on the object side (forward in the Z-direction, on the front side) when a wearer wears glasses including the eyeglass lens 1. The "eyeball-side surface 4" is the surface that is located on the opposite side, that is, the eyeball side (rearward in the Z-direction, on the rear side), when the wearer wears the glasses including the eyeglass lens 1.

In this specification, when the eyeglass lens is viewed in a front view, the left-right (horizontal) direction is set as the X-direction, the up-down direction is set as the Y-direction, and the thickness direction of the lens and the direction in which an optical axis extends are set as the Z-direction.

With the eyeglass lens 1 according to one aspect of the present disclosure, similarly to a conventional eyeglass lens 1, the base portion (substrate base portion) of the lens substrate 2 excluding the minute convex portions (i.e., the later-described substrate convex portions 6 and the coating film convex portions 11 thereon) disclosed in Patent Document 1 and the base portion (coating film base portion) on the outermost surface thereon function to cause rays that have entered from the object-side surface 3 to be emitted from the eyeball-side surface 4 and to cause the emitted rays to converge at the predetermined position A (i.e., the function for realizing the prescription power). "Convergence" in this specification refers to converging in at least one of the vertical direction and the horizontal direction. Also, the number of convergence positions need not be one, and the convergence positions may vary in the direction in which an optical axis extends depending on a portion in one coating film convex portion 11. Note that, although this convergence occurs when light passes through an eye of the wearer as well as when light passes through the eyeglass lens 1, a description thereof will be omitted hereinafter for convenience of description.

Figure 2:
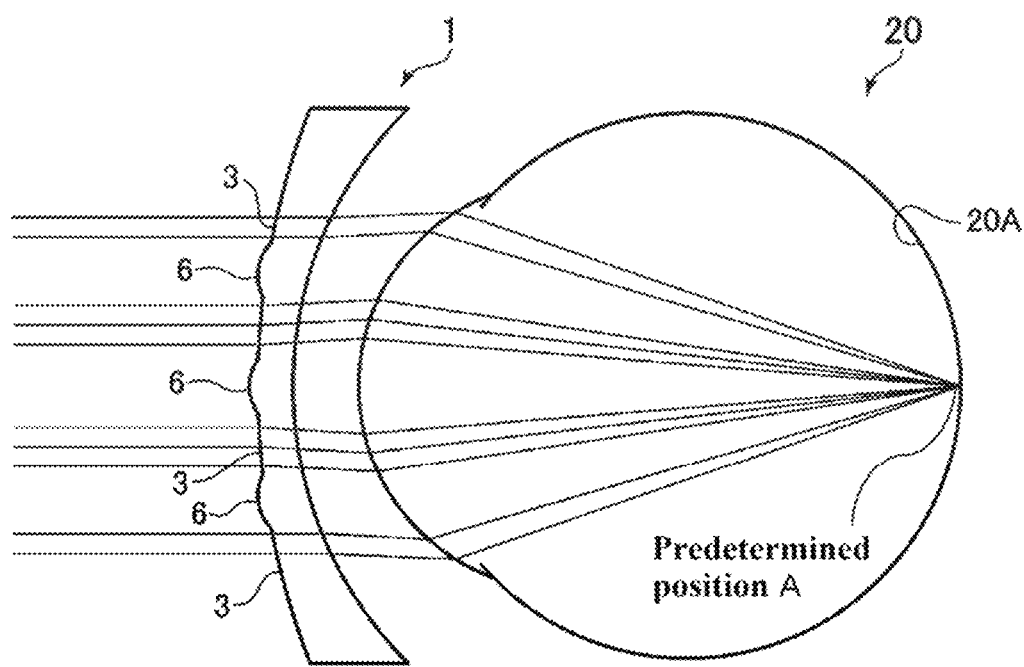
FIG. 2 is a schematic side sectional view illustrating how an eyeglass lens according to one aspect of the present disclosure causes rays that have entered from an object-side surface to be emitted from an eyeball-side surface and causes the emitted rays to converge at a predetermined position A on the retina of an eyeball due to a portion (that is, the base portion) other than the coating film convex portions.

FIG. 2 is a schematic side sectional view illustrating how the eyeglass lens 1 according to one aspect of the present disclosure causes rays that have entered from the object-side surface 3 to be emitted from the eyeball-side surface 4 and causes the emitted rays to converge at the predetermined position A located on a retina 20A of an eyeball 20, due to a portion (i.e., the coating film base portion) other than the coating film convex portions 11.

The eyeglass lens 1 according to one aspect of the present disclosure includes a lens substrate 2. The lens substrate 2 also has an object-side surface 3 and an eyeball-side surface 4. The shape of both surfaces of the lens substrate 2 may be determined according to the type of eyeglass lens 1, and may be a convex surface, a concave surface, a flat surface, or a combination thereof.

The eyeglass lens 1 is formed by forming a coating film so as to cover at least one of the object-side surface and the eyeball-side surface of the lens substrate 2.

A plurality of substrate convex portions 6 are formed on at least one of the object-side surface 3 and the eyeball-side surface 4 of the lens substrate 2 according to one aspect of the present disclosure. In a state in which the coating film is formed on the substrate convex portions 6 and the coating film convex portions 11 originating from the substrate convex portions 6 are formed on the outermost surface of the coating film, the coating film convex portions 11 cause rays that have entered the eyeglass lens 1 to converge at a position B that is closer to the object than the predetermined position A is.

Figure 3:
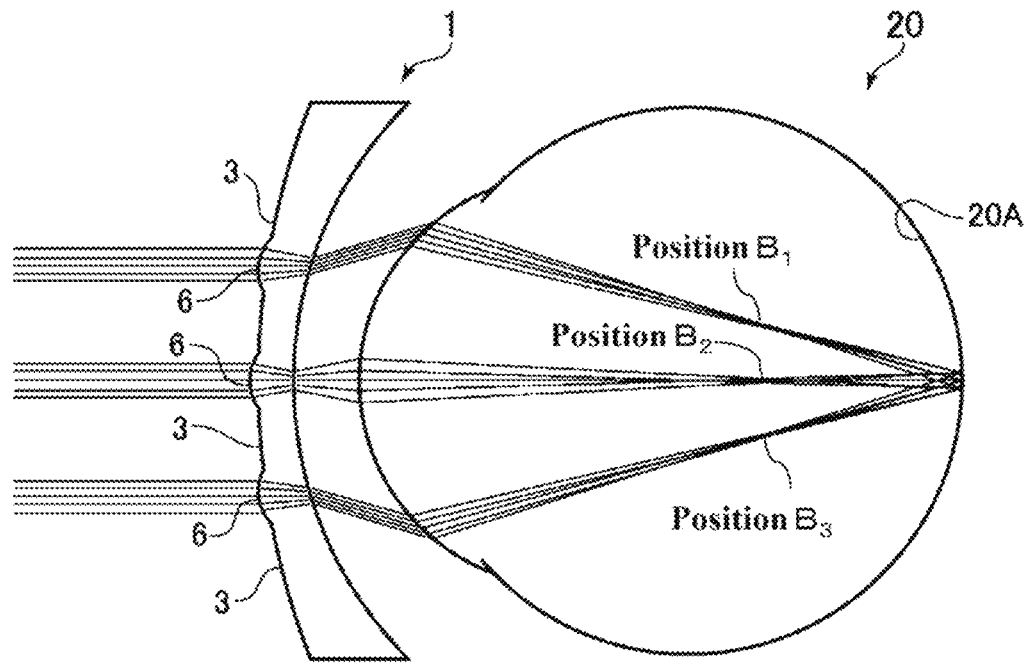
FIG. 3 is a schematic side sectional view illustrating how an eyeglass lens according to one aspect of the present disclosure causes rays that have entered from the object-side surface to be emitted from the eyeball-side surface and causes the emitted rays to converge at a position B that is closer to the object than the predetermined position A is, due to coating film convex portions.

FIG. 3 is a schematic side sectional view illustrating how the eyeglass lens 1 according to one aspect of the present disclosure causes rays that have entered from the object-side surface 3 to be emitted from the eyeball-side surface 4 and causes the emitted rays to converge at the position B that is closer to the object than the predetermined position A is due to the coating film convex portions 11. Note that this convergence position B exists as positions $B_1, B_2, B_3, \ldots B_N$ according to the plurality of coating film convex portions 11. The convergence position B in this specification is an expression of the collection of the positions $B_1, B_2, B_3, \ldots B_N$.

In one aspect of the present disclosure, the shape of a convex portion (e.g., the coating film convex portion 11) on the outermost surface of the eyeglass lens located on the side on which the base substrate convex portions 6 are provided is an approximate shape of the base substrate convex portion configured to cause rays that have entered the eyeglass lens to converge at the position B that is closer to the object than the predetermined position A is.

The approximate shape of the substrate convex portion refers to a shape in a state in which a sphere (referred to as the shape of a virtual partial sphere hereinafter) that is optimally approximated to the shape of the coating film convex portion 11 and the shape of the substrate convex portion 6 are approximated to each other.

One specific example of the approximate shape of the substrate convex portion is as follows. It is preferable that the maximum absolute value of the differences in the lens thickness direction between the sphere that is optimally approximated to the shape of the coating film convex portion 11 and the shape of the actual coating film convex portion 11 is 0.1 µm or less (preferably, 0.06 µm or less).

The following describes advantages in defining the shape of a virtual partial sphere and the difference.

If no coating film is provided, the substrate convex portions 6 have a substantially partially spherical shape, and rays are focused at the position B that is closer to the object. Even if a coating film is formed on the lens substrate 2 and the coating film convex portion 11 has a more obtuse shape than the substrate convex portion 6 does, at least a vertex portion of the coating film convex portion 11 has a shape that follows the substrate convex portion 6.

In one aspect of the present disclosure, based on a substantially partially spherical shape of the vertex portion of the coating film convex portion 11, a sphere that is optimally approximated to this substantially partially spherical shape is virtualized. Accordingly, a virtual partially spherical shape is obtained. Then, the virtual partially spherical shape is compared to the shape of the actual coating film convex portion 11.

Figure 4:
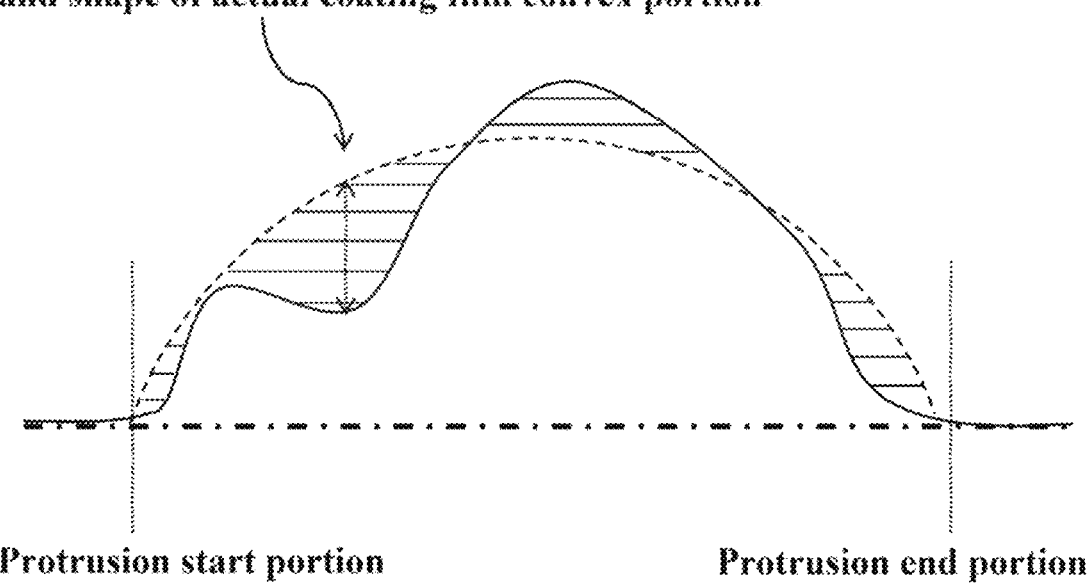
FIG. 4 is a schematic cross-sectional view illustrating a coating film convex portion of an actual eyeglass lens and the shape of a virtual partial sphere.

FIG. 4 is a schematic cross-sectional view illustrating the coating film convex portion 11 of the actual eyeglass lens 1 and the virtual partially spherical shape. The solid line indicates the coating film convex portion 11 of the actual eyeglass lens 1, the broken line indicates the virtual partially spherical shape, the dash-dot line indicates a coating film base portion of the actual eyeglass lens 1, and a horizontally hatched portion indicates the difference in the lens thickness direction between the virtual partially spherical shape and the shape of the actual coating film convex portion 11.

The virtual partially spherical shape refers to a partial shape of a sphere that is optimally approximated to the shape of the coating film convex portion 11 of the actual eyeglass lens 1. This virtual partially spherical shape can be obtained using the method of least squares, for example.

One specific example of optimal approximation is as follows. A spherical shape is disposed to overlap the shape of the coating film convex portion 11. The differences in the lens thickness direction (an optical axis method, the Z-axis) between the two shapes of portions whose protrusions start from the base portion on the outermost surface of the eyeglass lens 1 and end at the base portion through the vertex are squared. A virtual partially spherical shape that minimizes the sum of these values is set.

As a method other than the method of least squares, the virtual partially spherical shape may be obtained from the vertex of the coating film convex portion 11 and the positions of a plurality of points in the vicinity thereof. In this case, the difference may be examined by matching the vertex of the virtual partially spherical shape with the vertex of the coating film convex portion 11 of the actual eyeglass lens 1.

If the maximum absolute value of the differences is 0.1 µm or less (preferably, 0.06 µm or less), the coating film convex portion 11 is very close to the partially spherical shape. As a result, the effect of suppressing near-sightedness can be sufficiently exhibited. Furthermore, when this specified value is applied, the effect of suppressing near-sightedness can be significantly exhibited, and the need to expose a cross-section of the actually produced eyeglass lens 1 to check whether or not the shape of the coating film convex portion faithfully reflects the shape of the substrate convex portion is eliminated.

A point where a curve, which is obtained by curving the shape of the coating film convex portion 11 and differentiating the obtained curve once, has increased may be used as the protrusion start portion protruding from the base portion on the outermost surface. Also, a peak rising portion that rises from the astigmatism profile curve shown in FIG. 11, which will be described later, may be used as the protrusion start portion. The protrusion end portion may be set in a similar manner.

The following describes further specific examples of one aspect of the present disclosure, preferred examples, and variations.

In one aspect of the present disclosure, out of a large number of rays that can be obtained through ray tracing calculation, evenly enter a predetermined range of an object-side surface of an eyeglass lens, and pass through the coating film, the number of stray light rays that do not pass through the vicinity of the predetermined position A and also do not pass through the vicinity of the position B that is closer to the object is preferably set to 30% or less of the number of incident rays.

The following describes advantages in reducing stray light rays and the ratio of stray light rays (also referred to as a "stray light ratio" hereinafter).

Stray light rays are rays that enter from the object-side surface 3 of the eyeglass lens 1 and are emitted from the eyeball-side surface 4, and refer to rays that do not pass through the vicinity of the predetermined position A at which rays are converged by the eyeglass lens 1, and also do not pass through the vicinity of the position B at which rays are converged by the substrate convex portions 6 and the coating film convex portions 11. Stray light rays cause blurring of the wearer's visual field. Thus, it is preferable to reduce the stray light ratio relative to rays that enter from the object-side surface 3 of the eyeglass lens 1 and are emitted from the eyeball-side surface 4.

One of the reasons stray light rays occur is the coating film. If the shape extending from the convex surface, which is the object-side surface 3 serving as the base, changes excessively smoothly at the base of the coating film convex portion 11, the resulting shape differs from the spherical shape of the substrate convex portion 6, and also differs from the convex surface, which is the object-side surface 3. Accordingly, rays will not be focused on the retina 20A of the wearer (the vicinity of the predetermined position A in this specification), and will not be focused in the vicinity of the position B that is closer to the object.

On the other hand, as with the eyeglass lens 1 of one aspect of the present disclosure, even after a coating film is formed on the lens substrate 2, the effect of suppressing near-sightedness can be sufficiently exhibited by setting the stray light ratio to 30% or less.

Ray tracing calculation is used to set and calculate the stray light ratio. A situation in which a large number of rays evenly enter a predetermined range of the object-side surface of the eyeglass lens and pass through the coating film (i.e., a situation in which the eyeglass lens is worn and the wearer is looking at their surroundings) is presumed in this calculation. This "predetermined range" needs only be an optical region on the object-side surface. This "optical region" indicates a portion having a curved surface shape that realizes the power set for each wearer on the object-side surface and the eyeball-side surface that is located opposite thereto.

Considering that one of the reasons for the generation of stray light rays is the coating film and that the coating film is essential for the eyeglass lens 1 according to one aspect of the present disclosure, the stray light ratio may be set to more than 0% (or 1% or more, and 3% or more) and 30% or less. Also, it is preferable to reduce the ratio of stray light rays, and thus the stray light ratio is preferably set to 20% or less, and more preferably set to 15% or less.

Here, conditions under which the stray light ratio is determined will be described below.

Figure 5:
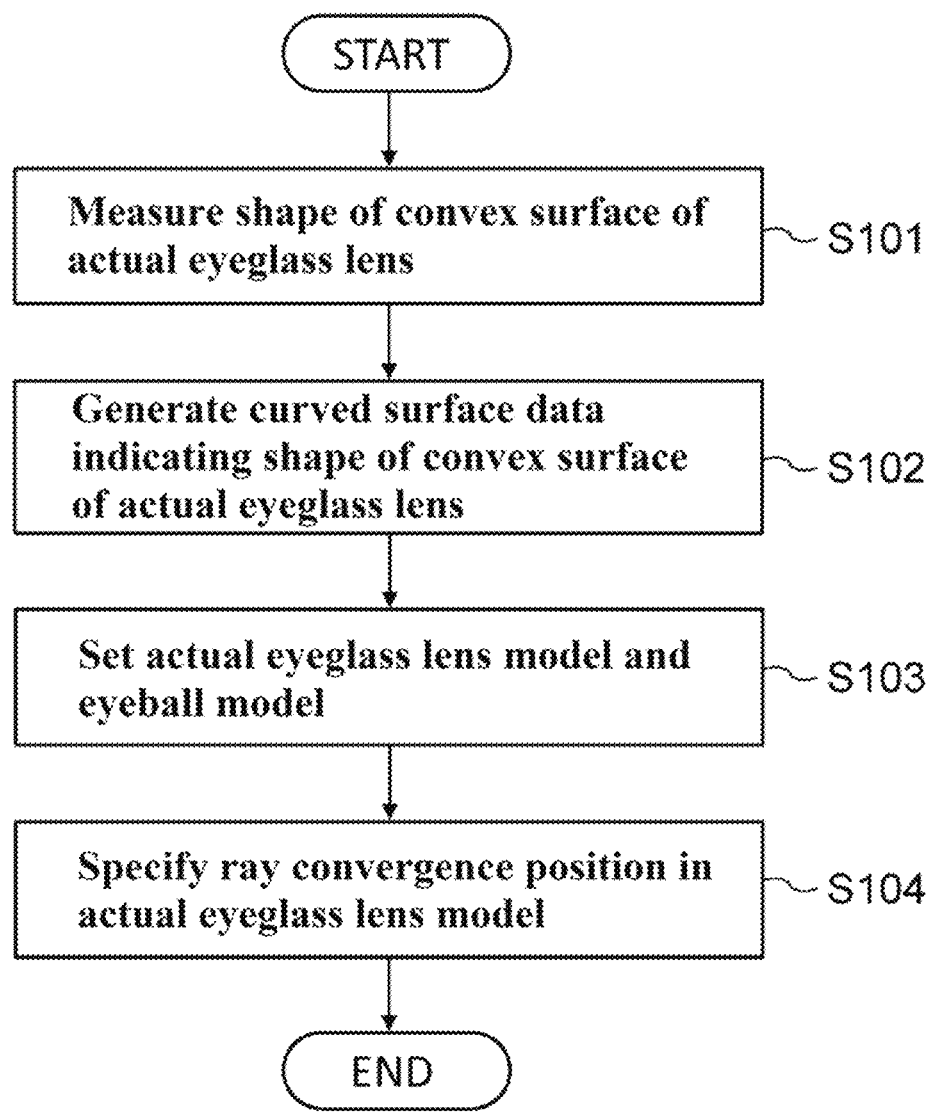
FIG. 5 is a flowchart showing the flow of a method for inspecting an eyeglass lens according to one aspect of the present disclosure.

FIG. 5 is a flowchart showing the flow of a method for inspecting an eyeglass lens according to one aspect of the present disclosure.

As shown in FIG. 5, first, in step S101, the shape of the object-side surface (also referred to as "convex surface") of the actual eyeglass lens 1 is measured, and curved surface data representing the shape of the convex surface 3 is generated (shape measurement step). The shape of the convex surface 3 is measured using a noncontact three-dimensional microscope for measuring length, utilizing light interference, for example. The three-dimensional shape of the convex surface 3 is acquired as discrete three-dimensional data (x, y, z), for example.

Then, in step S102, curved surface data is generated from the obtained data indicating the shape of the convex surface of the eyeglass lens 1 (curved surface data generation step). Note that, if discrete three-dimensional data is used as data indicating the shape of the convex surface of the eyeglass lens 1, a set of B-spline curves need only be generated, for example. Also, if measured discrete three-dimensional data includes noise, moving average processing may be performed and an average value may be used, for example.

Then, in step S103, a model of the actual eyeglass lens 1 is set based on the curved surface data (model setting step). The model of the actual eyeglass lens 1 is set, and an eyeball model is also set. Information relating to the wearer (e.g., the axial length and accommodation amount of the eye) may be used for an eyeball model. At this time, an eyeglass lens model 30 may be disposed with respect to an eyeball model 32 in consideration of the inclination of the eyeglass lens when attached to the frame thereof (a forward tilt angle and a frame tilt angle).

Then, in step S104, the position at which rays converge most when the rays have passed through the actual eyeglass lens 1 is specified through a ray tracing process (convergence position specifying step). Specifically, the PSF (Point Spread Function) representing the luminance distribution of rays obtained after rays emitted from an indeterminately distant light source have passed through the model set based on the curved surface data of the actual eyeglass lens 1 is obtained.

The PSF can be obtained by tracing a large number of rays emitted from the point light source and calculating the density of spots on any plane. Then, the position (plane) on which rays are most concentrated in any plane is specified by comparing the PSFs in the relevant plane. Note that the diameter of rays need only be set based on a motion diameter, and may be set to $4\varphi$, for example.

Figure 6:
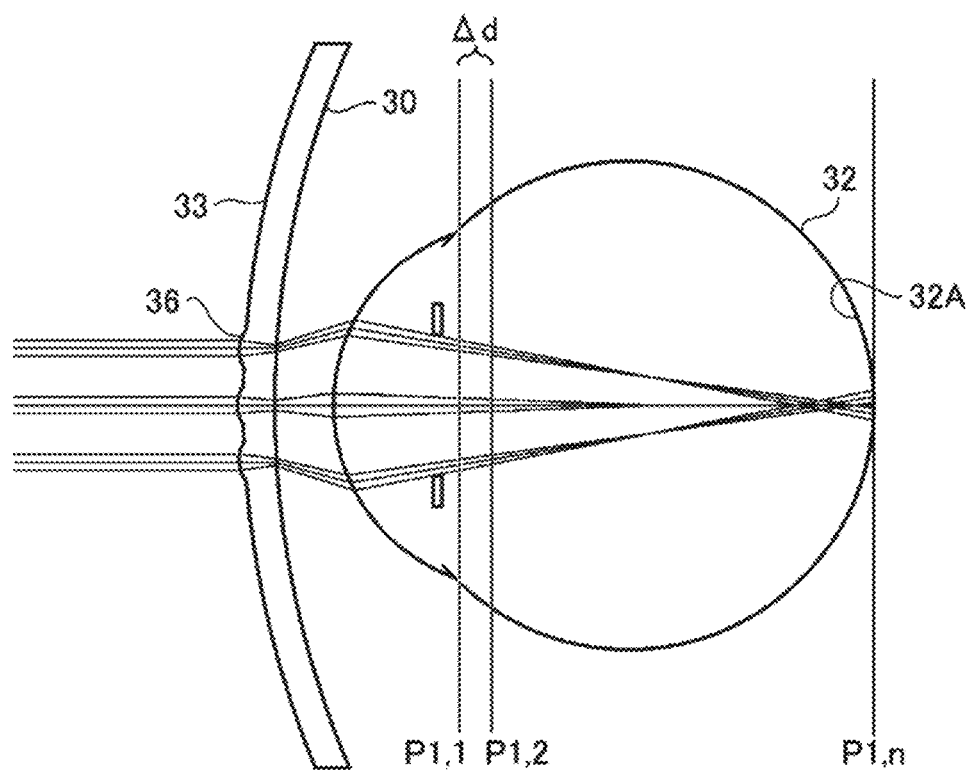
FIG. 6 is a diagram (No. 1) illustrating a method for specifying a position at which rays are concentrated.
Figure 7:
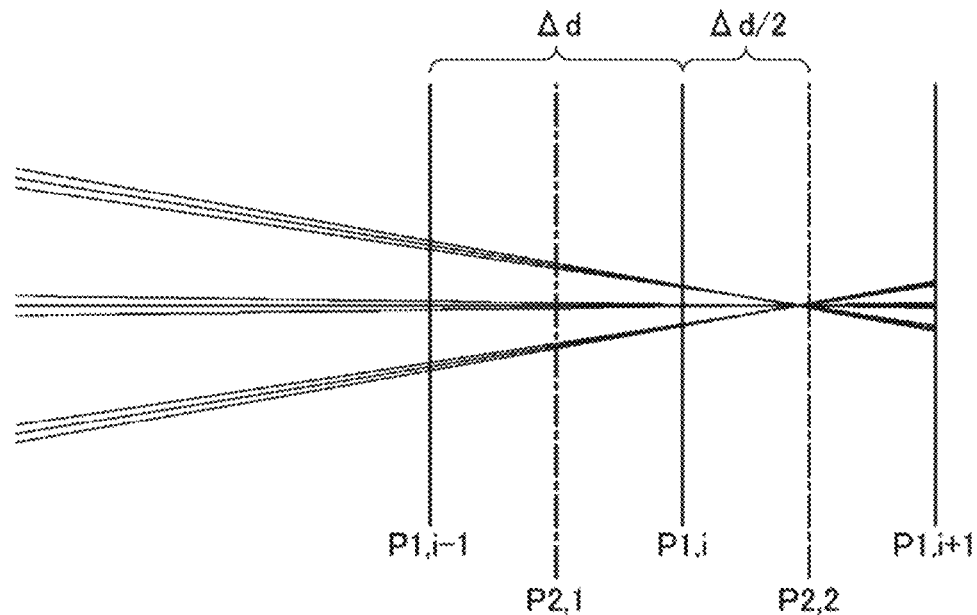
FIG. 7 is a diagram (No. 2) illustrating a method for specifying a position at which rays are concentrated.
Figure 8:
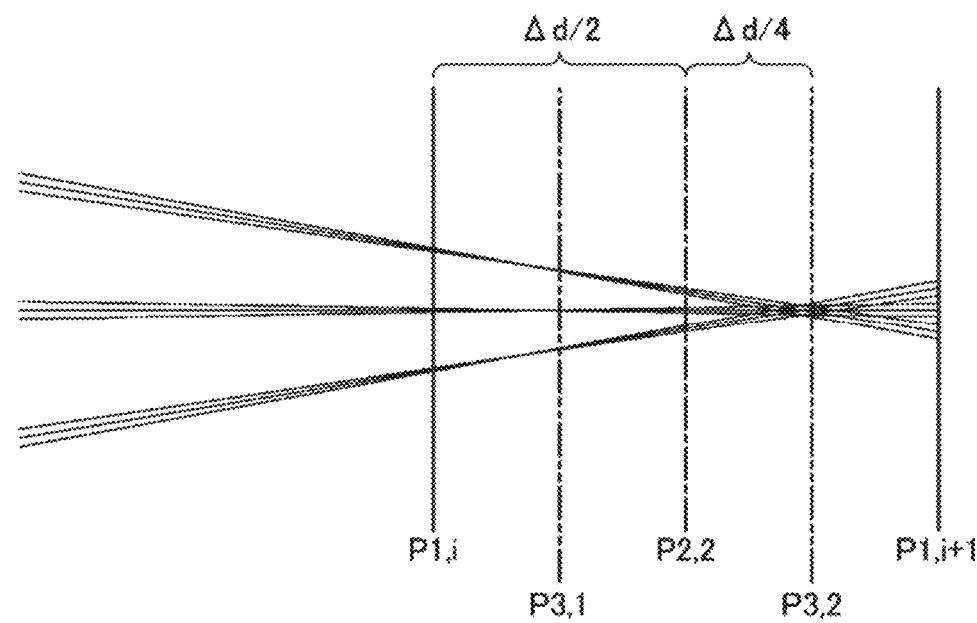
FIG. 8 is a diagram (No. 3) illustrating a method for specifying a position at which rays are concentrated.
Figure 9:
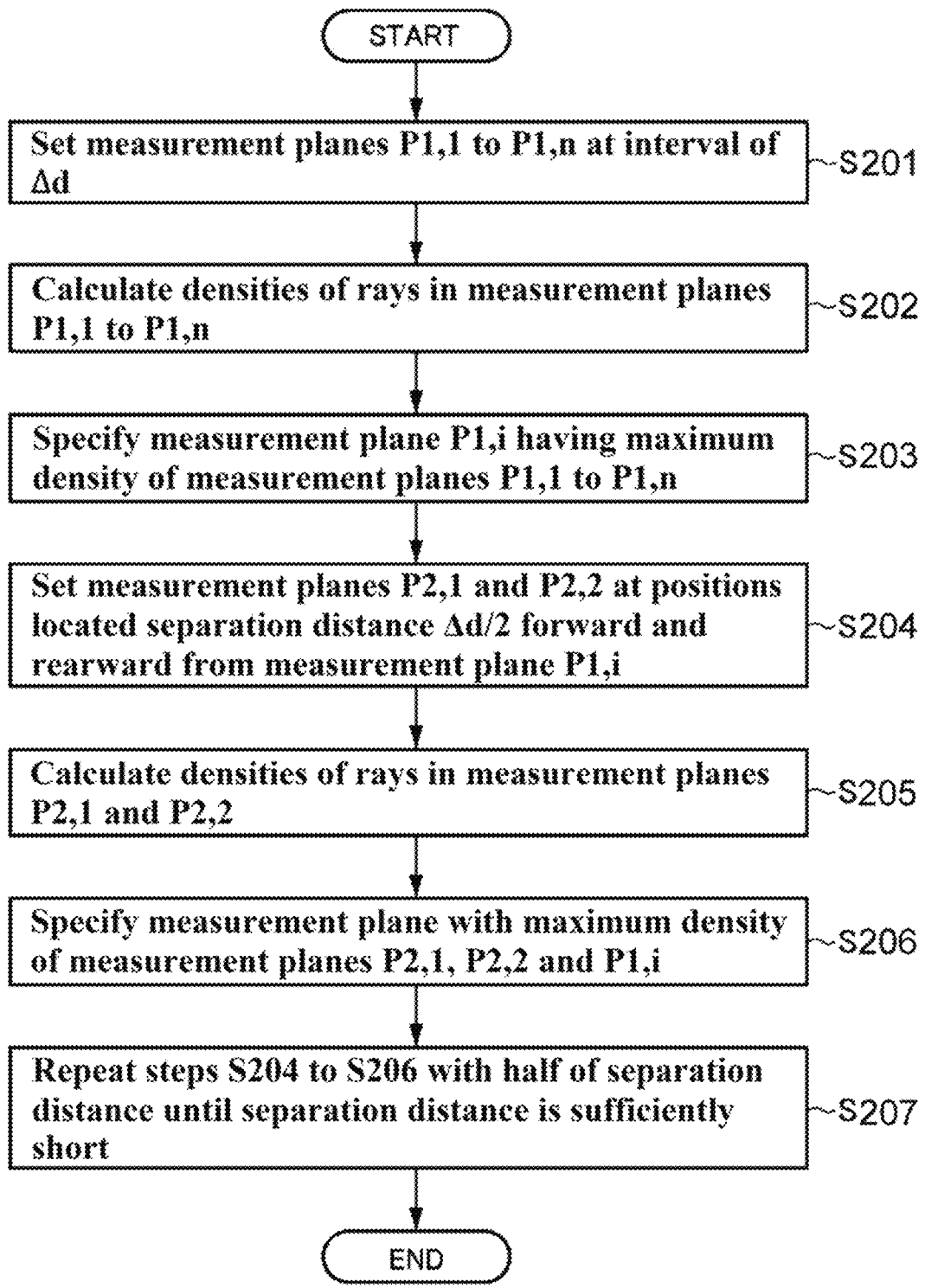
FIG. 9 is a flowchart illustrating a method for specifying a position at which rays are concentrated.

Here, a method for specifying, in step S104, the position at which rays are most concentrated will be described in more detail. FIGS. 6 to 8 are diagrams illustrating the method for specifying a position at which rays are concentrated. Also, FIG. 9 is a flowchart showing the method for specifying a position at which rays are concentrated.

First, as shown in FIG. 6, in step S201, a situation is presumed in which rays pass through the coating film convex portion 36 of the object-side surface (the convex surface) 33 on a model. Then, measurement planes P1,1 to P1,n are set at increments of a predetermined separation interval $\Delta d$ (e.g., 0.1 mm) from a predetermined distance (e.g., a position located at about 16 mm, which is the thickness of the vitreous body) from a position of 0 mm on the retina 32A of the eyeball model 32 to the retina 32A. Note that the separation interval $\Delta d$ may be set to an interval of 0.2 mm or 1/50 of the axial length of the eye.

Then, a ray tracing process is performed, and the densities of rays in the measurement planes P1,1 to P1,n are calculated in step S202. The densities of rays need only be calculated by setting a lattice-shaped grid (e.g., 0.1 mm×0.1 mm) to each measurement plane and calculating the number of rays passing through the grids, for example.

Then, in step S203, in order to specify a measurement plane where rays that have entered the convex portion have the maximum density, of the measurement planes P1,1 to P1,n, the measurement plane P1,i where rays have the first maximal density from the predetermined distance is specified. In order to omit calculation, calculation of the ray density may be started from the measurement plane P1, and calculation of this step may be terminated when, after the first maximal value is detected, the value obtained by calculating the ray density decreases to about an intermediate value between the value in the measurement plane P1 and the first maximal value.

Then, as shown in FIG. 7, in step S204, the measurement plane P2,1 and the measurement plane P2,2 are set at positions located a separation distance $\Delta d/2$ forward and rearward from the measurement plane P1,i with the maximum density. Then, the densities of rays in the measurement plane P2,1 and the measurement plane P2,2 are calculated in step S205. The measurement plane with the maximum density is specified from the measurement planes P2,1, P2,2, and P1,i in step S206.

Then, in step S207, the same steps as steps S204 to S206 are repeated until the separation distance becomes significantly short. That is, as shown in FIG. 8, a step of setting a new measurement plane (P3,1 and P3,2 in FIG. 8) at a position located anew separation distance ($\Delta d/4$ in FIG. 8), which is half of the previous separation distance, forward and rearward from the measurement plane (P2,2 in FIG. 8) that previously had the maximum density, a step of calculating the density of rays in the new measurement plane, and a step of specifying the measurement plane that previously had the maximum density and a measurement plane out of the new measurement planes that has the maximum are repeated.

It is possible to specify a position at which rays are concentrated in the direction in which the optical axis extends (the thickness direction of the lens, the Z-axis) through the above-described steps.

The position at which rays converge on a plane perpendicular to the direction of the optical axis (i.e., on the specified measurement plane) is then specified. The above-described PSFs are used to specify this position. A portion (a point on the measurement plane) at which rays are most concentrated is specified using the PSFs, as a ray convergence position B on the measurement plane.

Also, the number of rays located outside a radius of 2.5 to 20 μm from the ray convergence position B on the measurement plane is calculated, for example. The inner side of a radius of 2.5 to 20 μm (a radius of 5.7 μm is adopted in this specification) from the convergence position B refers to the "vicinity of the position B" in this specification, for example.

Rays located inside a radius of 2.5 to 20 μm from the predetermined position A at which rays are converged by the eyeglass lens (i.e., normal rays that converge at the position A) are subtracted from the rays outside the above range, for example. The inner side of a radius of 2.5 to 20 μm (a radius of 5.7 μm is adopted in this specification) from the convergence position A refers to the "vicinity of the position A" in this specification, for example.

The rays remaining after subtraction do not converge in the vicinity of the position A at which rays converge due to the eyeglass lens 1 itself, and do not converge in the vicinity of the position B at which rays converge due to the coating film convex portion 11 and that is closer to the object. Such rays are referred to as stray light in this specification. Also, even after a coating film is formed on the lens substrate 2, the effect of suppressing near-sightedness can be sufficiently exhibited by setting the stray light ratio to 30% or less.

It is preferable that the coating film convex portion 11 causes rays that have entered the eyeglass lens 1 to converge at the position B that is closer to the object than the predetermined position A is by an amount in a range of more than 0 mm and 10 mm or less. In other words, the outermost surface of the eyeglass lens 1 of one aspect of the present disclosure (i.e., the outermost surface of the coating film) has a shape that causes rays that have entered the eyeglass lens 1 to converge at the position B that is closer to the object than the predetermined position A is by an amount in a range of more than 0 mm and 10 mm or less. Note that the above-described range is preferably 0.1 to 7 mm, more preferably 0.1 to 5 mm, and even more preferably 0.3 to 3 mm.

The relationship between a protruding length $L_c$ of the coating film convex portion 11 and a protruding length $L_l$ of the substrate convex portion 6 preferably satisfies Formula (1) below.

$$0.6 \leq L_c/L_l \leq 1.5 \quad \text{Formula (1)}$$

When this condition is satisfied, the coating film convex portion 11 originating from the substrate convex portion 6 can sufficiently bring the convergence position B of rays that have entered the eyeglass lens 1 closer to the object than the predetermined position A, even if a coating film is formed on the substrate convex portion 6. This means that the coating film convex portion 11 and thus the eyeglass lens 1 of one aspect of the present disclosure can exhibit a sufficient effect of suppressing near-sightedness.

Note that a "protruding length" $L_c$ of a coating film convex portion 11 refers to the distance from the coating film base portion of the shape of the outermost surface of the eyeglass lens 1 to the vertex of the coating film convex portion 11 in the direction in which an optical axis extends (the thickness direction of the lens, the Z-axis). The protruding length $L_l$ of the substrate convex portion 6 refers to the distance from the substrate base portion of the lens substrate 2 to the vertex of the substrate convex portion 6 in the direction in which an optical axis extends (the thickness direction of the lens, the Z-axis).

It is preferable that the full width at half maximum of a profile curve of the astigmatism at the base of the coating film convex portion 11 in an astigmatism distribution with respect to the shape of the outermost surface of the coating film is 0.20 mm or less.

The "base (also referred to as a surrounding region) of a coating film convex portion" in this specification refers to the boundary between the coating film base portion on the outermost surface of the eyeglass lens and the coating film convex portion, and the coating film base portion in the vicinity thereof, and a portion where astigmatism begins to rapidly increase. Astigmatism (profile curve) in a cross-sectional view of the eyeglass lens can be measured using a method called coherence correlation interferometry. Also, a substantially annular region located 0.2 times the distance between the center and the boundary from the boundary in a direction away from the center of the coating film convex portion in a plan view may be referred to as the base of the coating film convex portion.

Figure 10:
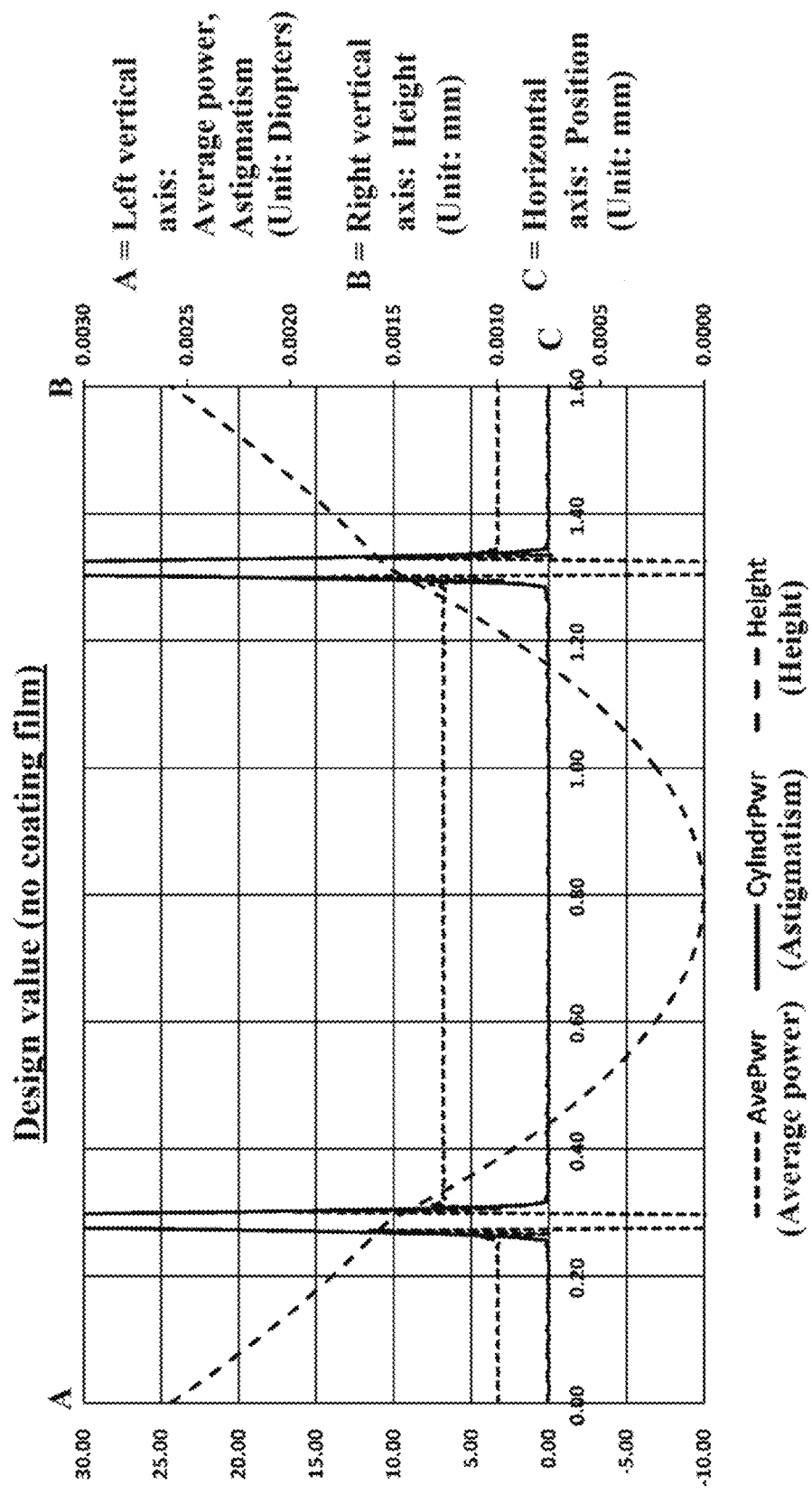
FIG. 10 is a diagram showing a plot (solid line) of, with regard to design values (i.e., no coating film), an astigmatism distribution (i.e., an astigmatism profile curve) on a cross-section passing through the vertex of a substrate convex portion (i.e., the center of the substrate convex portion in a plan view), in the astigmatism distribution with respect to the substrate convex portion and the vicinity thereof.

FIG. 10 is a diagram showing a plot (solid line) of, with regard to design values (i.e., no coating film), an astigmatism distribution (i.e., an astigmatism profile curve) on a cross-section passing through the vertex of the substrate convex portion 6 (i.e., the center of the substrate convex portion 6 in a plan view), in the astigmatism distribution with respect to the substrate convex portion 6 and the vicinity thereof.

Figure 11:
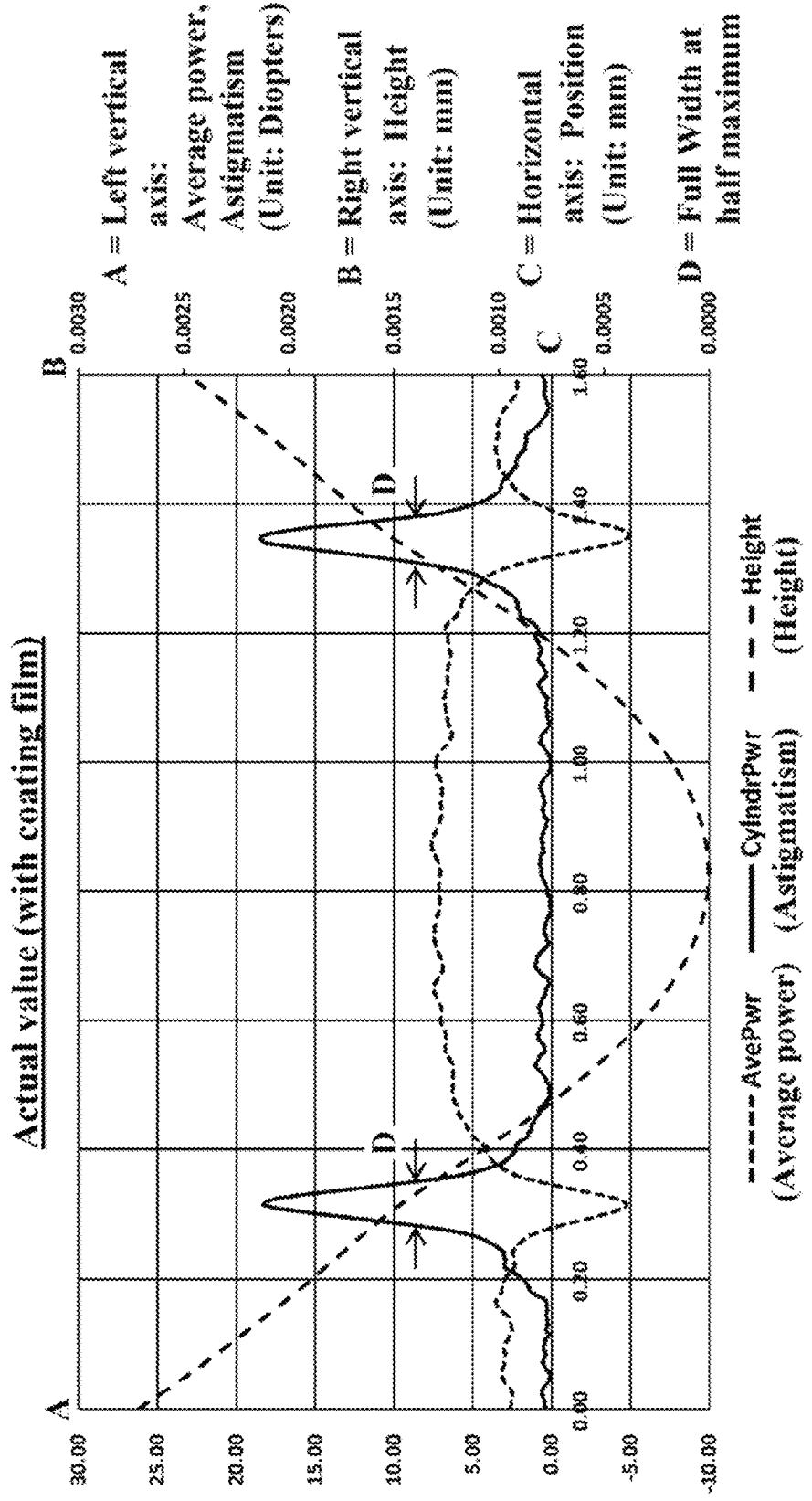
FIG. 11 is a diagram showing a plot (solid line) of an astigmatism distribution (i.e., an astigmatism profile curve) on a cross-section passing through the vertex of a coating film convex portion (i.e., the center of the coating film convex portion in a plan view), in the astigmatism distribution with respect to an actual coating film convex portion and the vicinity thereof.

FIG. 11 is a diagram showing a plot (solid line) of an astigmatism distribution (i.e., an astigmatism profile curve) on a cross-section passing through the vertex of the coating film convex portion 11 (i.e., the center of the coating film convex portion in a plan view), in the astigmatism distribution with respect to the actual coating film convex portion 11 and the vicinity thereof.

In FIGS. 10 and 11, the horizontal axis indicates the X-axis, i.e., a position in the horizontal direction when the object-side surface 3 of the eyeglass lens 1 is viewed in a plan view, and the units thereof are in mm. The Y-axis, i.e., a vertical (top-bottom) direction when the object-side surface 3 of the eyeglass lens 1 is viewed in a plan view may be used, instead of the X-axis.

The left vertical axis indicates a value of astigmatism (and average power), and the units thereof are in diopters.

The right vertical axis indicates the height of the coating film convex portion 11 or the substrate convex portion 6, and the units thereof are in mm.

Note that the coating film convex portion 11 or the substrate convex portion 6 is a portion with 0.3 to 1.3 mm in length on the horizontal axis. Also, a plot (dotted line) of an average power distribution (i.e., average power distribution profile curve), and a plot (broken line) of the height of the coating film convex portion 11 or the substrate convex portion 6 in the Z-axis are also shown.

As shown in FIG. 10, in terms of design, the astigmatism profile curve is substantially constant in the substrate convex portion 6 and a substantially horizontal portion, which is the base portion, and only a portion between the substrate convex portion 6 and the base portion has a shape different from a spherical shape. Thus, only this portion has a high astigmatism value.

On the other hand, as shown in FIG. 11, with the astigmatism profile curve for the actual coating film convex portion 11 and the vicinity thereof, astigmatism increases in a comparatively wide range in the X-axis direction between the coating film convex portion 11 and the coating film base portion (the vicinity of X=0.3 mm and the vicinity of X=1.3 mm). This indicates that the portion located between the coating film convex portion 11 and the coating film base portion has a shape that is different from a spherical shape in a comparatively wider range, compared to that shown in FIG. 10, which is a design value.

One of the causes of stray light rays is that the shape changes excessively smoothly from the coating film base portion at the base of the coating film convex portion 11. That is to say, if the coating film base portion and the coating film convex portion 11 are clearly separated from each other, one of the causes of stray light rays can be eliminated, and thus the effect of suppressing near-sightedness can be sufficiently exhibited even after a coating film is formed on the lens substrate 2. In view of this, the astigmatism profile curve is utilized to prove that there are few portions having an undefined shape, which is one of the causes of stray light rays, between the coating film base portion and the coating film convex portion 11. That is to say, the degree of change (i.e., a gradient change in the coating film) in the shape of the base of the coating film convex portion 11 is defined using the astigmatism profile curve for the coating film convex portion 11.

As the name suggests, the peak width at half of the value (in diopters) of the peak apex point may be used for the full width at half maximum shown in FIG. 11 pertaining to the actual eyeglass lens. In FIG. 11, for example, the full width at half maximum is about 0.10 mm in the vicinity of X=0.3 mm and in the vicinity of X=1.3 mm.

By specifying the full width at half maximum of the astigmatism profile curve as 0.20 mm or less, it is shown that the shape thereof sharply changes from the base portion toward the coating film convex portion 11, and thus the eyeglass lens 1 of one aspect of the present disclosure can sufficiently exhibit the effect of suppressing near-sightedness.

It is preferable that the coating film includes a λ/4 film (not shown) that is in contact with the lens substrate 2, the hard coating film 8 formed on the λ/4 film, and the antireflection film 10 formed on the hard coating film 8.

There is no particular limitation to the λ/4 film as long as the λ/4 film is a film that optically has a thickness of λ/4, and a film that is used for an antireflection filter may also be used. A urethane resin (having a refractive index n of 1.54) may be used as the λ/4 film as one specific example, and the thickness thereof may be 70 to 90 nm.

There is no particular limitation to the hard coating film 8 as long as the scratch resistance of the eyeglass lens 1 can be improved. A silicon compound (having a refractive index n of 1.50) may be used as the hard coating film 8 as one specific example, and the thickness thereof may be 1.5 to 1.9 μm.

A known antireflection film may be used as the antireflection film 10.

It is preferable that the refractive index of the lens substrate 2 is higher than that of the λ/4 film, and the refractive index of the λ/4 film is higher than that of the hard coating film 8.

The following describes specific details other than the above-described details.

[Lens Substrate 2]

There is no particular limitation on aspects of the sizes and arrangement of multiple substrate convex portions 6 on the surface of the lens substrate 2. There is no limitation on the substrate protruding portions as long as the substrate protruding portions mainly function to cause luminous flux that enters from the object-side surface to be emitted from the eyeball-side surface and to converge on the object side (forward) relative to the retina. The substrate convex portion 6 can be determined from the viewpoint of external visibility of the substrate convex portion 6, designability imparted by the substrate convex portion 6, adjustment of the refractive power by the substrate convex portion 6, and the like, for example.

There is no limitation on the size of the substrate protruding portions as described above, and the substrate protruding portions are sized or shaped such that the thickness of a coating film formed at the base thereof can be varied. The shape thereof may be circular in a plan view, or spherical as a three-dimensional shape, for example. The shape thereof may be an elliptical shape in a plan view, or may also be a toric shape as a three-dimensional shape. The same applies to the shape of a coating film convex portion.

Figure 14A:
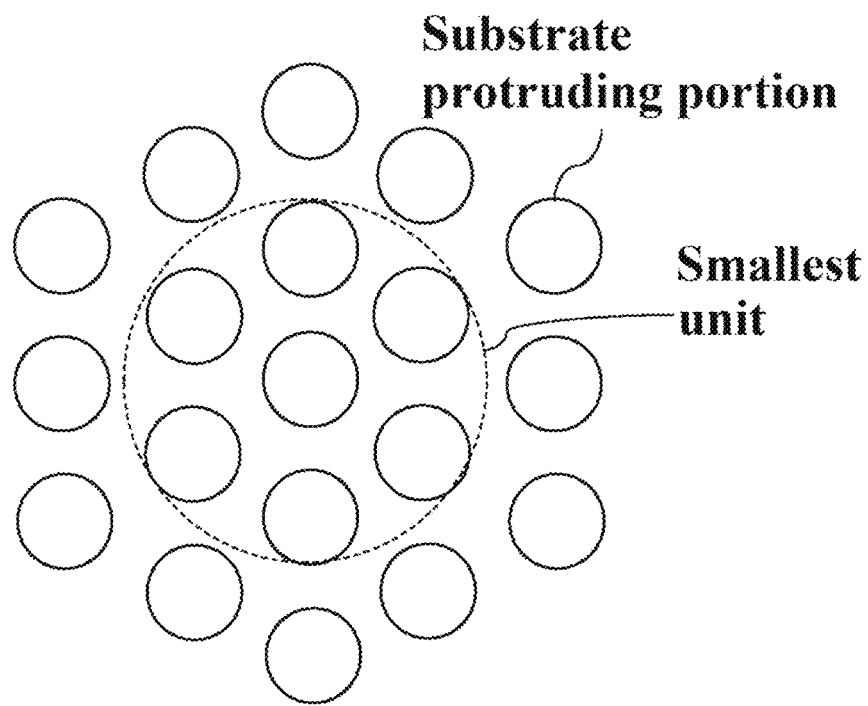
FIG. 14A is a diagram of a case where a discrete arrangement in which the centers of the coating film convex portions independently serve as the vertexes of an equilateral triangle in a plan view (the center of each coating film convex portion is located at a vertex of a honeycomb structure) is adopted.
Figure 14B:
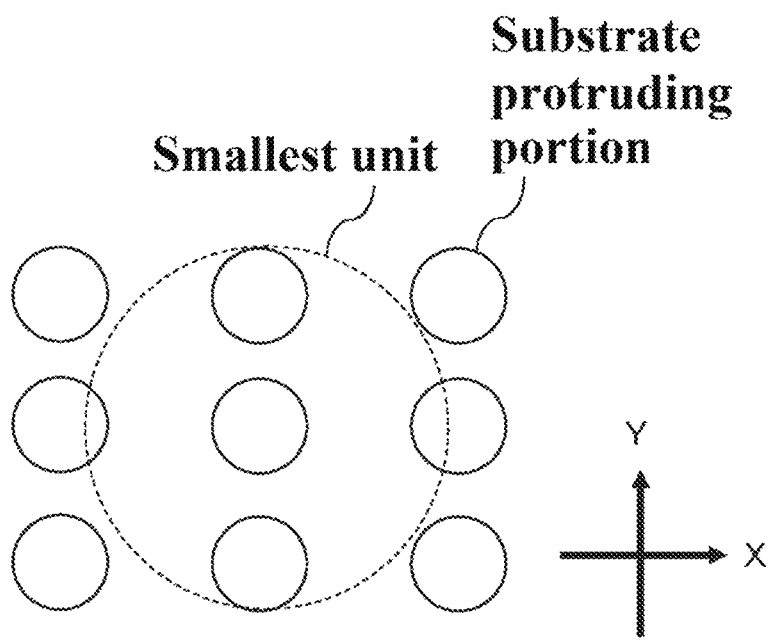
FIG. 14B is a diagram of a case where a structure in which the coating film convex portions are arranged in a row in a plan view is adopted.

FIG. 14A is a diagram of a case where a discrete arrangement in which the centers of the coating film convex portions independently serve as the vertexes of an equilateral triangle in a plan view (the center of each coating film convex portion is located at a vertex of a honeycomb structure) is adopted, and FIG. 14B is a diagram of a case where a structure in which the coating film convex portions are arranged in a row in a plan view is adopted. A dotted line indicates a circular region that is used to measure a stray light ratio (details thereof will be described later).

As described above, there is no limitation on aspects of the arrangement of the substrate protruding portions. As shown in Example 1 described later and FIG. 14A, a discrete arrangement in which the centers of the substrate protruding portions independently serve as the vertexes of an equilateral triangle in a plan view (the center of each substrate protruding portion is located at a vertex of a honeycomb structure) may be adopted.

As shown in FIG. 14B below, a structure in which the substrate protruding portions are arranged in a row in a plan view may be adopted. Furthermore, a structure in which substrate protruding portions are arranged in a row and other substrate protruding portions are arranged in a row adjacent to the row may be adopted. At that time, the pitch between substrate protruding portions in one row (the distance between the centers of the substrate protruding portions, the same applies to the following), and the pitch between a substrate protruding portion in a given row and a substrate protruding portion in another row that is adjacent to that substrate protruding portion may be different from each other. Also, the interval between substrate protruding portions in one row may be different from the interval between rows that are adjacent to each other.

The height of a substrate convex portion 6 may be in a range of 0.1 to 10 μm, for example, or may be in a range of 0.5 to 2 μm (corresponding to a refractive power of 2.50 D to 6.50 D of a substrate protruding portion). The upper limit of the refractive power of the substrate protruding portion may be 5.50 D or 5.00 D, and the lower limit may be 3.00 D. The radius of curvature of the surface of the substrate convex portion 6 may be 50 to 250 mmR, for example. Also, the distance between substrate convex portions 6 that are adjacent to each other (the distance between an end portion of a given substrate convex portion 6 and an end portion of a substrate convex portion 6 that is adjacent to this substrate convex portion 6) may be substantially the same as the value of the radius of the substrate convex portion 6, for example. Also, the plurality of substrate convex portions 6 can be arranged substantially uniformly near the lens center, for example.

As illustrated in FIG. 10 in Patent Document 1, the substrate protruding portions may be formed at a center portion of the eyeglass lens, or as illustrated in FIG. 1 in Patent Document 1, the substrate protruding portions need not be formed at the center portion of the eyeglass lens.

Various lens substrates 2 that are usually used for the eyeglass lens 1 can be used as the lens substrate 2. The lens substrate 2 may be a plastic lens substrate or a glass lens substrate, for example. The glass lens substrate may be a lens substrate made of inorganic glass, for example. From the viewpoint of being light in weight and unlikeliness to crack, a plastic lens substrate is preferable as the lens substrate 2. Examples of the plastic lens substrate include styrene resins such as (meth)acrylic resins, allyl carbonate resins such as polycarbonate resins, allyl resins, diethylene glycol bis(allyl carbonate) resin (CR-39), vinyl resins, polyester resins, polyether resins, urethan resins obtained through a reaction between an isocyanate compound and a hydroxy compound such as diethylene glycol, thiourethane resins obtained through a reaction between an isocyanate compound and a polythiol compound, and cured products (generally called transparent resins) obtained by curing a curable composition containing a (thio)epoxy compound having one or more disulfide bonds in the molecule. The curable composition may be referred to as a "polymerizable composition". An uncolored substrate (colorless lens) or a colored substrate (colored lens) may be used as the lens substrate 2. There is no particular limitation on the thickness and the diameter of the lens substrate 2. The thickness (the central thickness) may be about 1 to 30 mm, and the diameter may be about 50 to 100 mm, for example. The refractive index of the lens substrate 2 may be set to about 1.60 to 1.75, for example. However, the refractive index of the lens substrate 2 is not limited to the above-described range, and may be within the above-mentioned range, or may be larger or smaller than the above-mentioned range. The "refractive index" as used in the present disclosure and this specification refers to a refractive index for light at a wavelength of 500 nm. By molding the lens substrate 2 through casting polymerization using a mold having a molding surface provided with a plurality of concave portions, the lens substrate 2 can be formed using a known forming method such as casting polymerization, the lens substrate 2 provided with the substrate convex portions 6 on at least one surface can be obtained, for example.

[Coating Film]

An aspect of a coating film to be provided on the surface of the lens substrate 2 provided with the substrate convex portions 6 is a cured film formed by curing a curable composition containing a curable compound. Such a cured film is commonly called a hard coating film 8, and contributes to improving the durability of the eyeglass lens 1. A curable compound means a compound having a curable functional group, and a curable composition means a composition containing one or more curable compounds.

An aspect of the curable composition for forming a cured film may be a curable composition containing an organosilicon compound as the curable compound, and a curable composition containing metal oxide particles together with an organosilicon compound. An example of a curable composition that can form a cured film is a curable composition described in JP S63-10640A.

Also, an aspect of the organosilicon compound may be an organosilicon compound represented by General Formula (I) below or a hydrolysate thereof.

In General Formula (I), $R^1$ represents an organic group having a glycidoxy group, an epoxy group, a vinyl group, a methacryloxy group, an acryloxy group, a mercapto group, an amino group, a phenyl group, or the like, $R^2$ represents an alkyl group having 1 to 4 carbon atoms, an acyl group having 1 to 4 carbon atoms, or an aryl group having 6 to 10 carbon atoms, $R^3$ represents an alkyl group having 1 to 6 carbon atoms or an aryl group having 6 to 10 carbon atoms, and a and b independently represent 0 or 1.

The alkyl group having 1 to 4 carbon atoms represented by $R^2$ is a linear or branched alkyl group, and specific examples thereof include a methyl group, an ethyl group, a propyl group, and a butyl group.

Examples of the acyl group having 1 to 4 carbon atoms represented by $R^2$ include an acetyl group, a propionyl group, an oleyl group, and a benzoyl group.

Examples of the aryl group having 6 to 10 carbon atoms represented by $R^2$ include a phenyl group, a xylyl group, and a tolyl group.

The alkyl group having 1 to 6 carbon atoms represented by $R^3$ is a linear or branched alkyl group, and specific examples thereof include a methyl group, an ethyl group, a propyl group, a butyl group, a pentyl group, and a hexyl group.

Examples of the aryl group having 6 to 10 carbon atoms represented by $R^3$ include a phenyl group, a xylyl group, and a tolyl group.

Specific examples of the compound represented by General Formula (I) above include the compounds disclosed in paragraph [0073] of JP 2007-077327A. Since the organosilicon compound represented by General Formula (I) has a curable group, the hard coating film 8 can be formed as a cured film by performing curing processing after the application of such an organosilicon compound.

The metal oxide particles can contribute to the adjustment of the refractive index of the cured film and the improvement of the hardness thereof. Specific examples of the metal oxide particles include tungsten oxides ($WO_3$) particles, zinc oxide (ZnO) particles, silicon oxide ($SiO_2$) particles, aluminum oxide ($Al_2O_3$) particles, titanium oxide ($TiO_2$) particles, zirconium oxide ($ZrO_2$) particles, tin oxide ($SnO_2$) particles, beryllium oxide (BeO) particles, and antimony oxide ($Sb_2O_5$) particles, and these particles can be used alone or in combination of two or more types. It is preferable that the metal oxide particles have a particle diameter within a range of 5 to 30 nm from the viewpoint of achieving both scratch resistance and optical properties in the cured film. The content of the metal oxide particles in the curable composition can be set as appropriate in consideration of the refractive index and the hardness of a cured film to be formed, and may be normally set to about 5 to 80 mass % of the solid content in the curable composition. It is preferable that the metal oxide particles are colloidal particles from the viewpoint of dispersibility in a cured film.

The cured film can be formed by forming a coated film by directly applying or indirectly applying via another film, to a surface of the lens substrate 2 provided with the substrate convex portions 6, a curable composition prepared by mixing the above-described components and optional components such as an organic solvent, a surfactant (leveling agent), and a curing agent as needed, and performing curing processing (e.g., heating and/or photoirradiation) on the coated film according to the type of curable compound. Application of a curable composition will be described later in detail. If curing processing is performed through heating, for example, a curing reaction of the curable compound in a coated film may be advanced by placing the lens substrate 2 provided with the coated film made of the curable composition in an environment at an ambient temperature of 50° C. to 150° C. for about 30 minutes to 2 hours.

From the viewpoint of application suitability for spin coating, the viscosity of the curable composition for forming a coating film on the surface of the lens substrate 2 provided with the substrate convex portions 6 is preferably in a range of 1 to 50 mPa·s, more preferably in a range of 1 to 40 mPa·s, and even more preferably in a range of 1 to 20 mPa·s. The viscosity as used in the present disclosure and this specification refers to the viscosity at a liquid temperature of 25° C.

Also, an aspect of the coating film formed on the surface of the lens substrate 2 provided with the substrate convex portions 6 is a coating film that is commonly called a primer film and contributes to improving adherence between layers. Examples of a coating liquid capable of forming such a coating film include compositions (referred to as "dry solidifiable compositions" hereinafter) in which a resin component such as a polyurethane resin is dispersed in a solvent (water, an organic solvent, or a mixed solvent thereof). Solidification of such a composition is advanced by removing a solvent through drying. Drying can be performed through a drying process such as air drying or heat drying.

From the viewpoint of application suitability for spin coating, the viscosity of a dry solidifiable composition for forming a coating film on the surface of the lens substrate 2 provided with the substrate convex portions 6 is preferably in a range of 1 to 50 mPa·s, more preferably in a range of 1 to 40 mPa·s, and even more preferably in a range of 1 to 20 mPa·s.

[Supply of Coating Liquid]

A coating liquid for forming a coating film on the surface of the lens substrate 2 provided with the substrate convex portions 6 is supplied through spin coating. When the coating liquid is applied through spin coating, it is possible to inhibit a coating film from having an uneven film thickness due to liquid pooling in the surrounding regions of the substrate convex portions 6. The coating liquid can be applied through spin coating by placing the lens substrate 2 in a spin coater with the surface thereof provided with the substrate convex portions 6 facing vertically upward, and supplying the coating liquid onto the surface from above (e.g., discharging the coating liquid from a nozzle arranged above the surface) in a state in which the lens substrate 2 is rotated on the spin coater, for example. Here, from the viewpoint of forming a coating film having a more even thickness, the rotational speed of the lens substrate 2 in the spin coating is preferably in a range of 10 to 3000 rpm (rotations per minute), more preferably in a range of 50 to 2500 rpm, and even more preferably in a range of 100 to 2000 rpm. However, the present disclosure is not limited to a spin coating method, and may be realized by using a known method (e.g., a dipping method).

It is possible to form a coating film by performing processing (e.g., curing processing, a drying process, and the like) according to the type of coating liquid after the coating liquid is applied.

The film thickness of the coating film formed through the above-described steps may be in a range of 0.5 to 100 μm, for example. However, the film thickness of the coating film is determined depending on the functions required for the coating film, and is not limited to the above-described exemplary range.

Similarly to the substrate protruding portions, the height of the coating film convex portion may be in a range of 0.1 to 10 μm, for example, and is preferably in a range of 0.5 to 2 μm. Similarly to the substrate protruding portions, the defocus power of the coating film convex portion may also be a refractive power of 2.50 D to 6.50 D of the substrate protruding portion. The upper limit of the defocus power may be 5.50 D or 5.00 D, and the lower limit may be 3.00 D.

The "defocus power" in this specification refers to the difference between the refractive power of each defocus region and the refractive power of a portion other than the defocus region. In other words, "defocus power" refers to the difference obtained by subtracting the refractive power of a base portion from the average of the minimum refractive power and the maximum refractive power at a predetermined portion in the defocus region. A case where the defocus region is a convex portion region is described in this specification.

"Refractive power" in this specification refers to an average refractive power, which is the average of a refractive power in a direction a in which the refractive power is smallest and a refractive power in a direction b (the direction that is perpendicular to the direction a) in which the refractive power is largest.

One or more additional coating films can also be formed on the coating film. Examples of such coating films include various coating films such as the antireflection film 10, a water repellent or hydrophilic antifouling film, and an antifogging film. A known technique can be applied as a method for forming these coating films.

Also, if one of the surfaces of the lens substrate 2 does not have any substrate convex portions 6, it is also possible to form one or more additional coating films on such a surface of the lens substrate 2. Examples of such a coating film include various coating films that are usually provided on the eyeglass lens 1 (e.g., the hard coating film 8, a primer film, the antireflection film 10, an antifouling film, an antifogging film, and the like), and it is possible to apply a known technique to a method for forming these coating films.

With the above aspect of the present disclosure, a case was described in which the maximum absolute value of the differences in the lens thickness direction between a sphere that is optimally approximated to the shape of the coating film convex portion 11 and the shape of the actual coating film convex portion 11 was set to 0.1 μm or less. On the other hand, the eyeglass lens 1 according to the present disclosure is not limited to the specified value of the difference. In short, the aim of the present disclosure is that a convex portion present on the outermost surface of the eyeglass lens 1 located on the side on which the substrate convex portions 6 are provided causes rays that have entered the eyeglass lens 1 to converge at the position B that is closer to the object than the predetermined position A is even after a coating film is formed, and this aim is novel.

In addition to or in place of the above-described specified values of the eyeglass lens according to one aspect of the present disclosure, the following specified values may also be used.

Out of a large number of rays that can be obtained by ray tracing calculation, evenly enter a predetermined range of an object-side surface of an eyeglass lens, and pass through the coating film, the number of stray light rays that do not pass through the vicinity of the predetermined position A and also do not pass through the vicinity of the position B that is closer to the object is set to 30% or less of the number of incident rays.

In other words, the following configuration may be adopted.

An "eyeglass lens causes rays that have entered from an object-side surface to be emitted from an eyeball-side surface, and causes the emitted rays to converge at a predetermined position A, the eyeglass lens including
> a lens substrate having a plurality of substrate convex portions on at least one of the object-side surface and the eyeball-side surface,
> in which the eyeglass lens is configured to suppress generation of stray light rays that do not pass through the vicinity of the predetermined position A and also do not pass through the vicinity of the position B that is closer to the object than the predetermined position A is".

The case where the coating film is formed was described in another aspect thereof. On the other hand, although the coating film was certainly examined when obtaining the findings of the present disclosure, the coating film was merely an opportunity to obtain the findings of the present disclosure. Thus, this other aspect is not limited to the eyeglass lens 1 provided with the coating film. In short, a coating film is not required as long as this aspect has a configuration for suppressing generation of stray light rays that do not pass through the vicinity of the predetermined position A and also do not pass through the vicinity of the position B that is closer to the object than the predetermined position A is. Even if the lens substrate 2 is provided with no coating film, stray light rays may be generated depending on the shape of the substrate convex portion 6 of the lens substrate 2, for example. It is technically significant to adopt a configuration for suppressing generation of stray light rays in the eyeglass lens 1 in such a case. Also, a "configuration for suppressing generation of stray light rays" may be related to the shape of the object-side surface 3 or the eyeball-side surface 4 of the eyeglass lens 1, or may be related to the composition of the lens substrate 2 or the coating film.

Also, in addition to or in place of the above specified values of the eyeglass lens according to one aspect of the present disclosure, the following specified values may also be used.

In another aspect of the present disclosure, the maximum absolute value of differences in the lens thickness direction between the shape of the actual coating film convex portion and the shape of the actual substrate convex portion is 0.1 μm or less (preferably, 0.06 μm or less).

The following describes advantages for specifying the above-described difference.

Even if the coating film is formed on the lens substrate 2 and the coating film convex portion 11 has a more obtuse shape than the substrate convex portion 6 does, at least a vertex portion of the coating film convex portion 11 has a shape that follows the substrate convex portion 6.

That is to say, in another aspect of the present disclosure, the substantially partially spherical shape of the actual coating film convex portion 11 is compared to the partially spherical shape of the actual lens substrate 2.

Figure 12A:
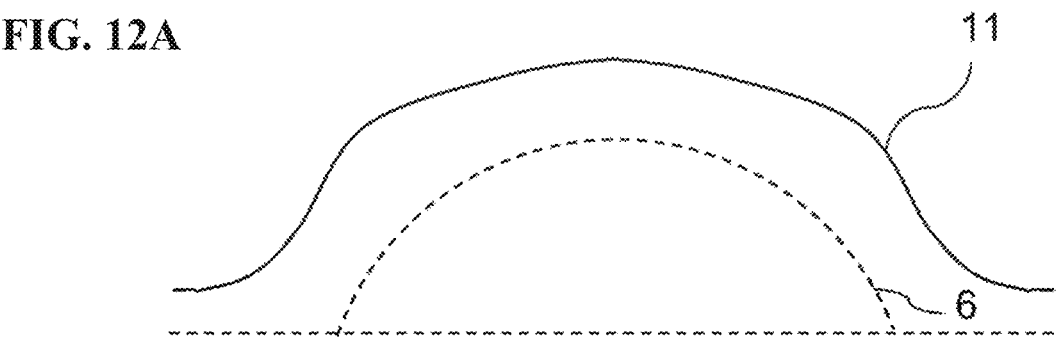
FIG. 12A is a schematic cross-sectional view illustrating a coating film convex portion and a substrate convex portion of an actual eyeglass lens.
Figure 12B:
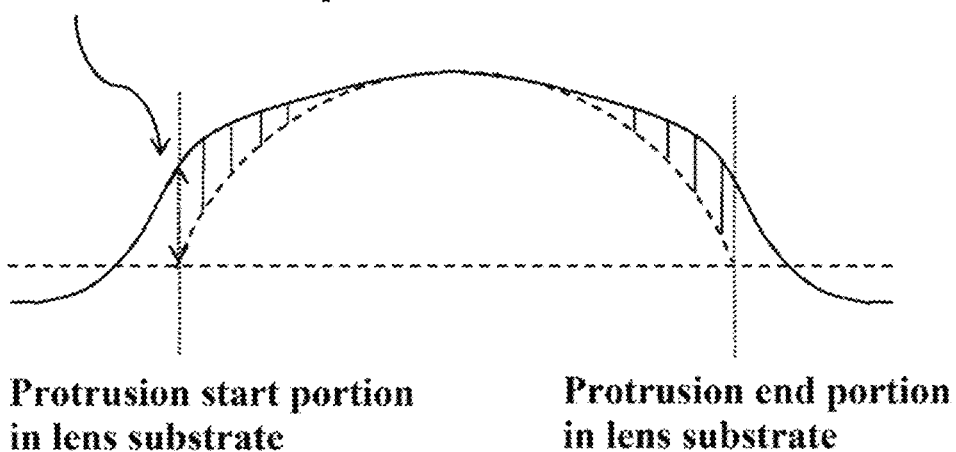
FIG. 12B is a schematic cross-sectional view in which the vertex of the coating film convex portion and the vertex of the substrate convex portion are matched.

FIG. 12A is a schematic cross-sectional view illustrating the coating film convex portion 11 and the substrate convex portion 6 of the actual eyeglass lens 1. FIG. 12B is a schematic cross-sectional view in which the vertex of the coating film convex portion 11 is matched with the vertex of the substrate convex portion 6. The solid line indicates the coating film convex portion 11 of the actual eyeglass lens 1, the broken line indicates the substrate convex portion 6, and a vertical line portion indicates the difference in the lens thickness direction between the shape of the coating film convex portion and the shape of the substrate convex portion.

In FIG. 12B, the vertex of the coating film convex portion 11 is matched with the vertex of the substrate convex portion 6, and then the difference in the lens thickness direction (an optical axis method) between the actual substrate convex portion 6 and the coating film convex portion 11 of the actual eyeglass lens 1, from a protrusion start portion that protrudes from the base portion of the substrate convex portion 6 to a protrusion end portion via the vertex, is examined.

If the maximum absolute value of the differences is 0.1 μm or less (preferably 0.06 μm or less), it is deemed that the coating film faithfully follows the shape of the substrate convex portion 6 present below the coating film. It was found that, as a result, the effect of suppressing near-sightedness can be sufficiently exhibited. The effect of suppressing near-sightedness can be sufficiently exhibited by applying this specified value. Note that the similarity ratio between the shape of the coating film convex portion 11 and the shape of the substrate convex portion 6 may be specified.

In addition to or in place of the above-described specified values of the eyeglass lens according to one aspect of the present disclosure, the following specified values may also be used.

An "eyeglass lens causes rays that have entered from an object-side surface to be emitted from an eyeball-side surface, and causes the emitted rays to converge at a predetermined position A, the eyeglass lens including
> a lens substrate having a plurality of substrate convex portions on at least one of the object-side surface and the eyeball-side surface; and
> a coating film covering a surface provided with the substrate convex portions,
> in which the coating film has a thickness of 3.0 μm or less.

In addition to or in place of the above-described specified values of the eyeglass lens according to one aspect of the present disclosure, the following specified values may also be used.

An "eyeglass lens causes rays that have entered from an object-side surface to be emitted from an eyeball-side surface, and causes the emitted rays to converge at a predetermined position A, the eyeglass lens including
> a lens substrate having a plurality of substrate convex portions on at least one of the object-side surface and the eyeball-side surface; and
> a coating film covering a surface provided with the substrate convex portions,
> in which convex portions present on the outermost surface of the eyeglass lens located on a side on which the substrate convex portions are provided and the substrate convex portions have common light ray convergence properties".

With this other aspect of the present disclosure, a case was described in which the maximum absolute value of the differences in the lens thickness direction between the shape of the actual coating film convex portion 11 and the shape of the actual substrate convex portion 6 was set to 0.1 μm or less. On the other hand, the eyeglass lens 1 according to this other aspect is not limited to the specified value of this difference. In short, the aim of this other aspect is that a convex portion present on the outermost surface of the eyeglass lens 1 located on the side on which the substrate convex portions 6 are provided and the substrate convex portions 6 have common light ray convergence properties, and this aim is novel. "Common light ray convergence properties" refer to properties for causing rays to converge at a position that is closer to the object than the predetermined position A is, at which rays are converged by the base portion of the eyeglass lens. Because the shape of the convex portions present on the outermost surface of the eyeglass lens 1 located on a side on which the substrate convex portions 6 are provided follows the shape of the substrate convex portions 6, they have common light ray convergence properties. Note that there is no particular limitation to the distance by how much closer the rays converge to the object relative to the predetermined position A. The position at which rays are converged by the convex portions present on the outermost surface of the eyeglass lens 1 located on the side on which the substrate convex portions 6 are provided, and the position at which rays are converged by the substrate convex portions 6 may be set in the above-described range from the predetermined position A, namely, a range of more than 0 mm and 10 mm or less, for example.

Also, with this other aspect, the difference in the lens thickness direction between the shape of the coating film convex portion 11 and the shape of the substrate convex portion 6 was specified. On the other hand, with the eyeglass lens 1 according to this other aspect, the thickness of the coating film may be specified, instead of specifying this difference. If a coating film is formed on the lens substrate 2 provided with the substrate convex portions 6 exhibiting the effect of suppressing near-sightedness and the coating film is excessively thick, the substrate convex portions 6 may be embedded in the coating film, and the difference between the coating film base portion and the coating film convex portion 11 may be lost. However, when the coating film has a thickness of 3.0 μm or less (preferably 2.0 μm or less), the shape of the coating film convex portion 11 favorably follows the shape of the substrate convex portion 6. Similarly to "common light ray convergence properties", this specified value can increase similarity. Also, similarly to the difference in the lens thickness direction between the shape of the coating film convex portion 11 and the shape of the substrate convex portion 6, the provision "the coating film has a thickness of 3.0 μm or less (preferably 2.0 μm or less)" is based on the technical ideas of "the coating film convex portion faithfully follows the shape of the substrate convex portion on the lens substrate".

The above-described technical ideas of the eyeglass lens of one aspect of the present disclosure is applicable to an eyeglass lens having a far-sightedness suppression function. Specifically, "convex portions" of the coating film convex portion 11 and the substrate convex portion 6 are changed to "concave portions". Accordingly, a coating film concave portion can cause rays that have entered the eyeglass lens to converge at a position B' that is located on the "eyeball side" of the predetermined position A. By changing the "convex portion" to a "concave portion" in the above-described eyeglass lens of one aspect of the present disclosure and changing a configuration such that rays converge at a position B' that is located on the "eyeball side" of the predetermined position A, the eyeglass lens has a far-sightedness suppression function.

EXAMPLES

Next, examples will be described, and the present disclosure will be described in detail. Needless to say, the present disclosure is not limited to the following examples.

Example 1

The following lens substrate was produced. Note that no other substance was laminated on the lens substrate. The prescription power was set to 0.00 D for S (spherical power) and 0.00 D for C (cylinder power).

Diameter of lens substrate in plan view: 100 mm
Type of lens substrate: PC (polycarbonate)
Refractive index of lens substrate: 1.589
Base curve of lens substrate: 3.30 D
Surface provided with substrate protruding portions: Object-side surface
Shape of substrate convex portion in plan view: Perfect circle (diameter 1 mm)
Height of substrate convex portion from substrate base portion: 0.8 mm
Arrangement of substrate convex portions in plan view: Discrete arrangement in which centers of substrate convex portions independently serve as vertexes of equilateral triangle (the center of each substrate convex portion is located at the vertex of a honeycomb structure)
Range in which substrate convex portions are provided: within circle with a radius of 17 mm from lens center
Pitch between substrate convex portions (the distance between the centers of substrate convex portions): 1.5 mm A coating film was formed on both surfaces of the lens substrate using a spin coating method. The conditions for the spin coating method were as follows.

Coating film liquid: Thermosetting coating agent
Rotational speed: 1300 rpm
Drying method after spin coating: Heating
Drying temperature after spin coating: 110° C.
Drying time after spin coating: 90 minutes Comparative Example 1

The conditions for the spin coating method were as follows. Everything else was the same as in Example 1.

Coating film liquid: Thermosetting coating agent
Rotational speed: 800 rpm
Drying method after spin coating: Heating
Drying temperature after spin coating: 110° C.
Drying time after spin coating: 90 minutes <Measurement of Defocus Power and Stray Light Ratio>

Defocus power was measured for Example 1 and Comparative Example 1. The defocus power (unit: D) is a value indicating how far the luminous flux is concentrated from the retina, and can be measured using ray tracing and part of the above-described method for measuring a stray light ratio.

Also, the stray light ratio was measured using the above-described method for Example 1 and Comparative Example 1. The stray light ratio is expressed as 100×(the number of stray light rays)/(the number of incident rays).

Note that the results of measurement of the defocus power and the stray light ratio were obtained as follows. Any circular region that includes the entirety of seven coating film convex portions in a range in which the substrate convex portions were formed (within a circle with a radius of 17 mm from the lens center) was presumed, and the values in the circular region were adopted as the results of measurements. An eyeglass model and an eyeball model were set using the above method, and multiple rays were caused to enter the circular region and the position at which the rays were concentrated was specified using the ray tracing method.

The eyeball model and various other conditions were as follows.

Axial length of eye: 24 mm

Accommodation amount of eye: 0.0 D

Distance between cornea and vertex of lens (CVD): 12.0 mm

Distance from vertex of cornea to rotation center of eyeball: 13.0 mm

Hereinafter, the above conditions were adopted unless otherwise stated. However, the present disclosure is not limited to the above conditions.

In the example, a given circular region that is shown in FIG. 14A and includes the entirety of seven coating film convex portions was presumed, for example. On the other hand, a circular region that includes the entirety of three coating film convex portions that are arranged in a row such as that shown in FIG. 14B may also be used. This circular region may be a circular region that includes the entirety of another coating film convex portion located at the shortest distance from one coating film convex portion centered on the one coating film convex portion (i.e., a substrate protruding portion), for example. In this specification, this circular region is also referred to as the "smallest unit". Six other coating film convex portions described above are provided in FIG. 14A, and two other coating film convex portions are provided in FIG. 14B.

Note that this circular region may coincide with the diameter of a lens-meter (PSF analysis range). Usually, the diameter of the lens meter is 4.0 mm. If the pitch between coating film convex portions (substrate protruding portions) is substantially the same as the diameter (e.g., 4.0 mm) of the lens-meter, one coating film convex portion may be provided in the circular region and used as the smallest unit.

The "stray light ratio" in this specification is a result obtained by performing measurement on the above smallest unit. That is, the "stray light ratio" in this specification is a result obtained by setting, as the smallest unit, a circular region (with a diameter of 4.0 mm, for example) that includes the entirety of another coating film convex portion located at the shortest distance from one coating film convex portion centered on the one coating film convex portion (i.e., a substrate protruding portion), and performing measurement on the smallest unit.

The eyeglass lens according to this specification includes a plurality of the smallest units. If the stray light ratio in at least one of the smallest units of the eyeglass lens satisfies the above numerical range, effects of the present disclosure are exhibited. It is preferable that more than 50%, 80% or more, 90% or more, or 95% or more of the plurality of the smallest units satisfy the specified values of the stray light ratio in a suitable order.

Here, first, an eyeglass model in which a plurality of design shapes were used was set, and the position at which light was concentrated was examined using the method described in "Description of Embodiments". As for the convex surface of a design eyeglass model (lens substrate), the substrate base portion was a sphere, and a substrate convex portion was constituted by a sphere having a radius of curvature that was smaller than the radius of curvature of the substrate base portion. A plurality of design shapes were set by discretely changing the radius of curvature of the substrate convex portion with respect to the sphere of the substrate base portion having a constant curvature. Also, a value obtained by subtracting the surface refractive power [D] according to the radius of curvature of the substrate base portion from the surface refractive power [D] according to the radius of curvature of the substrate convex portion was used as the defocus value. A correlation equation between this defocus value and a defocus power calculated from the reciprocal of the actual position at which light was concentrated was obtained using the ray tracing method used for the eyeglass model in which a plurality of design shapes were used.

Figure 13:
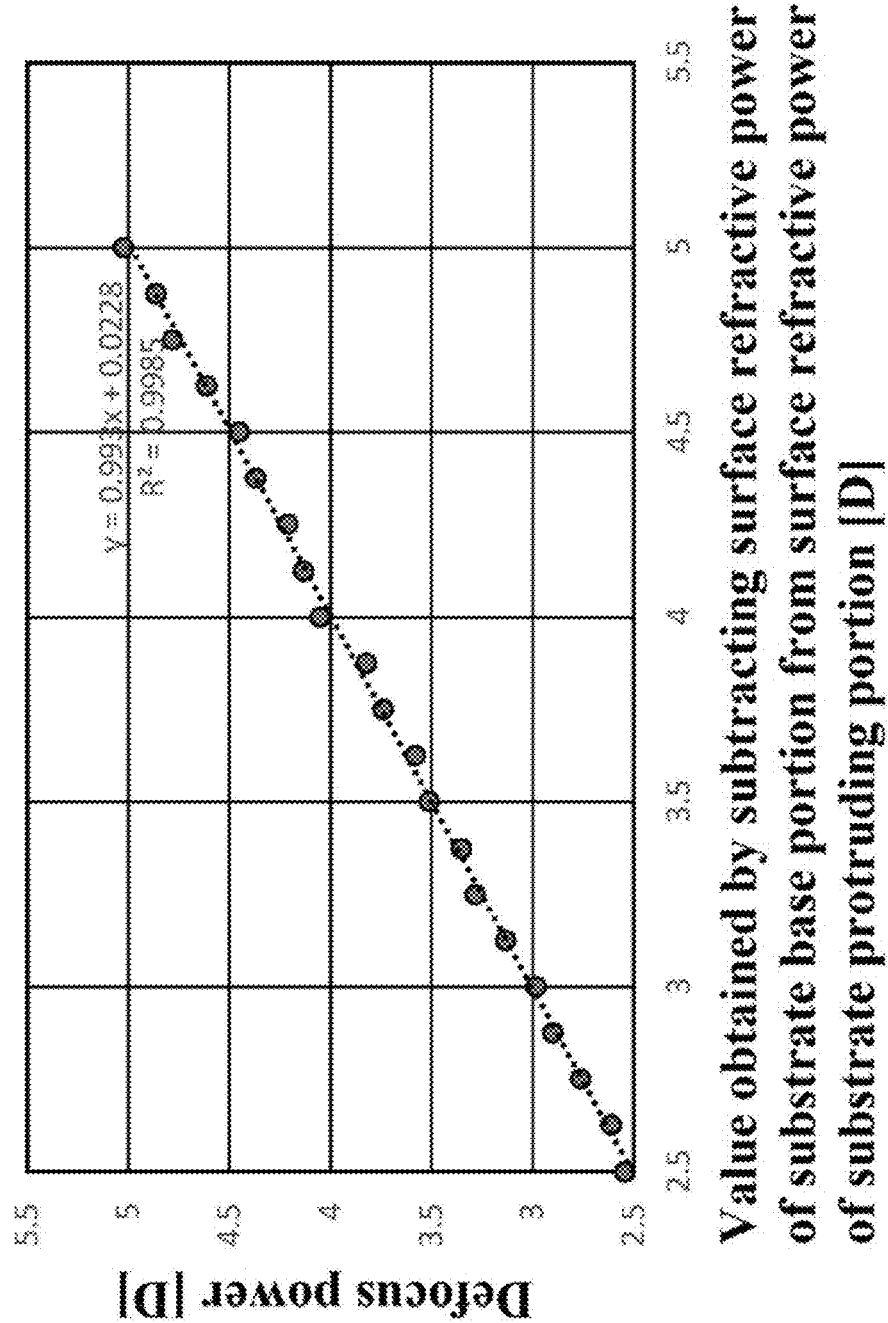
FIG. 13 is a diagram showing a plot of a correlation equation between a value (a defocus value) (horizontal axis) obtained by subtracting the surface refractive power of the substrate base portion from the surface refractive power of the substrate convex portion and a defocus power (vertical axis) calculated based on the reciprocal of the position at which light is concentrated.

FIG. 13 is a diagram showing a plot of the correlation equation between the value (defocus value) (horizontal axis) obtained by subtracting surface refractive power of the substrate base portion from the surface refractive power of the substrate convex portion and the defocus power (vertical axis) calculated from the reciprocal of the position at which light was concentrated.

In Example 1, the defocus power was measured by obtaining a value that corresponds to a defocus power in the eyeglass lens produced in Example 1, using this correlation equation.

The stray light ratio was also calculated from the PSF of the position at which light was concentrated and that was obtained using the method described in one aspect of the present disclosure.

In Example 1 and Comparative Example 1, it is presumed that there were seven regions where rays were concentrated on a plane that is perpendicular to the direction in which an optical axis extends at the light concentration position (the direction in which an optical axis extends) obtained at the time the defocus power was measured. This is to virtualize any circular region that includes the entirety of seven coating film convex portions. When a lattice-shaped grid is set to each measurement plane, the number of rays passing through the grids is calculated, and the grid with a certain number or more of rays passing therethrough is examined, it is conceivable that rays are concentrated and distributed in the seven regions.

In Example 1 and Comparative Example 1, the positions of the centers of gravity in the corresponding regions were obtained as a plurality of convergence positions B, and a value obtained by subtracting rays near the position A from rays outside the vicinity of the positions B was used as the number of stray light rays. The stray light ratio was calculated from the number of stray light rays, using the method described in [Description of Embodiments].

The stray light ratio of the eyeglass lens in Example 1 was lower than that of the eyeglass lens in Comparative Example 1. Specifically, in the eyeglass lens in Example 1, the defocus power was 3.51 D, and the stray light ratio was 11.25%, which was in a range of 30% or less, whereas the eyeglass lens in Comparative Example 1 did not satisfy these conditions. Also, the eyeglass lens in Example 1 sufficiently secured the defocus power, compared to the eyeglass lens in Comparative Example 1.

<Profile Curve of Astigmatism at Base of Coating Film Convex Portion>

A profile curve of astigmatism at the base of a coating film convex portion in an astigmatism distribution with respect to the shape of the outermost surface of the coating film was obtained for Example 1. This profile curve can be measured using a method called coherence correlation interferometry.

The results of Example 1 are shown in FIG. 11 mentioned before.

In FIG. 11 relating to Example 1, a profile curve of astigmatism at the base of the coating film convex portion in the astigmatism distribution with respect to the shape of the outermost surface of the coating film was 0.20 mm or less, whereas that condition was not satisfied in Comparative Example 1.

REFERENCE SIGNS LIST

1 Eyeglass lens
2 Lens substrate

3 Object-side surface (convex surface)
4 Eyeball-side surface (concave surface)
6 Substrate convex portion
8 Hard coating film
10 Antireflection film
11 Coating film convex portion
20 Eyeball
20A Retina
30 Eyeglass lens model
32 Eyeball model
32A Retina
33 Object-side surface (convex surface) on model
36 Coating film convex portion on model

The invention claimed is:

1. An eyeglass lens configured to cause rays that have entered from an object-side surface to be emitted from an eyeball-side surface, and cause the emitted rays to converge at a predetermined position A on a retina of a wearer, the eyeglass lens comprising:
a lens substrate having a plurality of substrate convex portions on at least one of the object-side surface and the eyeball-side surface; and
a coating film covering the surface provided with the substrate convex portions, wherein
the shape of coating film convex portions present on the outermost surface of the eyeglass lens located on a side on which the substrate convex portions are provided is an approximate shape of the substrate convex portions configured to cause rays that have entered the eyeglass lens to converge at a position B that is closer to the object than the predetermined position A is,
the maximum absolute value of differences in a lens thickness direction between a sphere that is optimally approximated to the shape of the coating film convex portion and the shape of the actual coating film convex portion is 0.1 µm or less, and
the below (1) or (2) is satisfied:
(1) a shape of the sphere that is approximated to the shape of the coating film convex portion is a spherical shape, disposed to overlap the shape of the coating film convex portion, that is set such that the differences in the lens thickness direction between the two shapes of portions whose protrusions start from the base portion on the outermost surface of the eyeglass lens and end at the base portion through the vertex are squared and the sum of the squared differences is minimized, or
(2) the shape of the sphere that is approximated to the shape of the coating film convex portion is a spherical shape that is set by matching the vertex of the shape of the sphere that is approximated to the shape of the coating film convex portion with the vertex of the coating film convex portion.

2. The eyeglass lens according to claim 1,
wherein, out of a large number of rays that can be obtained by ray tracing calculation, evenly enter a predetermined range of the object-side surface of the eyeglass lens, and pass through the coating film, the number of stray light rays that do not pass through the vicinity of the predetermined position A and also do not pass through the vicinity of the position B that is closer to the object is less than or equal to 30% of the number of incident rays.

3. The eyeglass lens according to claim 1,
wherein a profile curve of astigmatism at a base of the coating film convex portion in an astigmatism distribution for the shape of the outermost surface of the coating film is 0.20 mm or less.

4. The eyeglass lens according to claim 1,
wherein (1) is satisfied.

5. The eyeglass lens according to claim 1,
wherein a relationship between a protruding length Lc of the coating film convex portion and a protruding length Ll of the substrate convex portion satisfies Formula (1) below, $0.6 \leq Lc/Ll \leq 1.5$         Formula (1).

6. The eyeglass lens according to claim 2,
wherein a profile curve of astigmatism at a base of the coating film convex portion in an astigmatism distribution for the shape of the outermost surface of the coating film is 0.20 mm or less.

7. The eyeglass lens according to claim 6,
wherein (1) is satisfied.

8. The eyeglass lens according claim 7,
wherein a relationship between a protruding length Lc of the coating film convex portion and a protruding length Ll of the substrate convex portion satisfies Formula (1) below, $0.6 \leq Lc/Ll \leq 1.5$         Formula (1).

* * * * *